US008943910B2

(12) United States Patent
Addleman et al.

(10) Patent No.: US 8,943,910 B2

(45) Date of Patent: Feb. 3, 2015

(54) ENHANCED SURFACE SAMPLER AND PROCESS FOR COLLECTION AND RELEASE OF ANALYTES

(75) Inventors: Raymond S. Addleman, Benton City, WA (US); David A. Atkinson, Richland, WA (US); John T. Bays, West Richland, WA (US); Wilaiwan Chouyyok, Richland, WA (US); Anthony D. Cinson, Richland, WA (US); Robert G. Ewing, Kennewick, WA (US); Aleksandr A. Gerasimenko, Salem, OR (US)

(73) Assignee: Battelle Memorial Institute, Richland, WA (US)

( * ) Notice: Subject to any disclaimer, the term of this patent is extended or adjusted under 35 U.S.C. 154(b) by 540 days.

(21) Appl. No.: 13/450,343

(22) Filed: Apr. 18, 2012

(65) Prior Publication Data

US 2013/0276555 A1 Oct. 24, 2013

(51) Int. Cl.
*G01N 1/04* (2006.01)

(52) U.S. Cl.
USPC ........................ 73/864.71

(58) Field of Classification Search
None
See application file for complete search history.

(56) References Cited

U.S. PATENT DOCUMENTS

2005/0288616 A1 12/2005 Bozenbury et al.
2006/0192098 A1 8/2006 Danylewych-May
2010/0077837 A1 4/2010 Fryxell et al.
2010/0330747 A1* 12/2010 Shin et al. .................... 438/125

FOREIGN PATENT DOCUMENTS

EP 0118180 A2 9/1984
EP 1599427 B1 12/2009

OTHER PUBLICATIONS

Ulman, A., Formation and Structure of Self-Assembled Monolayers, Chem. Rev., 96, 1996, 1533-1554.

Fryxell, G. E., et al., Design and synthesis of self-assembled monolayers on mesoporous supports (SAMMS): The importance of ligand posture in functional nanomaterials, Journal of Materials Chemistry, 17, 2007, 2863-2874.

Plueddeman, E. P. Silane Coupling Agents, Plenum, New York, 1991.

International Search Report/Written Opinion for International application No. PCT/US2013/021449, International Filing Date Jan. 14, 2013, Date of Mailing Oct. 16, 2013.

Perret, D., et al., LC-MS-MS Determination of Stabilizers and Explosives Residues in Hand-Swabs, Chromatographia, 68, 2008, 517-524.

Verkouteren, J. R., et al., A method to determine collection efficiency of particles by swipe sampling, Measurement Science and Technology, 19, 2008, 115101-115113.

Voyksner, R. D., et al., Trace analysis of explosives by thermospray high-performance liquid chromatography-mass spectrometry, Journal of Chromatography, 354, 1986, 393-405.

(Continued)

*Primary Examiner* — Robert R Raevis

(74) *Attorney, Agent, or Firm* — James D. Matheson

(57) ABSTRACT

An enhanced swipe sampler and method of making are described. The swipe sampler is made of a fabric containing selected glass, metal oxide, and/or oxide-coated glass or metal fibers. Fibers are modified with silane ligands that are directly attached to the surface of the fibers to functionalize the sampling surface of the fabric. The swipe sampler collects various target analytes including explosives and other threat agents on the surface of the sampler.

29 Claims, 11 Drawing Sheets

(56) References Cited

OTHER PUBLICATIONS

Shea, D. A., et al., Detection of Explosives on Airline Passengers: Recommendation of the 9/11 Commission and Related Issues, Analysts in Science and Technology Policy, R., Science and Industry Division, Ed. Congressional Researrch Service, The Library of Congress, 2006, CRS1-CRS6.
National Institute of Justice Guide for the Selection of Commercial Explosives Detection System for Law Enforcement Applications, NIJ Guide 100-99, U.S. Department of Justice, Office of Justice Programs, 1999.
Cook, G. W., et al., Using Gas Chromatography with Ion Mobility Spectrometry to Resolve Explosive Compounds in the Presence of Interferents*, Journal of Forensic Sciences, 55 (6), 2010, 1582-1591.
MacCrehan, W. A., A NIST Standard Reference Material (SRM) to Support the Detection of Trace Explosives, Analytical Chemistry, 81, 2009, 7189-7196.
Oxley, J. C., et al., Detection of Explosives in Hair Using Ion Mobility Spectrometry, J. Forensic Sci., 53 (3), 2008, 690-693.
Eiceman, G. A., et al., New uses of previously unheralded analytical instruments, Analytical Chemistry, 76, 2004, 390A-397A.
Ewing, R. G., et al., A critical review of ion mobility spectrometry for the detection of explosives and explosive related compounds, Talanta, 54, 2001, 515-529.
Eiceman, G. A., et al., Seperation of Ions from Explosives in Differential Mobility Spectrometry by Vapor-Modified Drift Gas, Analytical Chemistry, 76, 2004, 4937-4944.
Thiesan, L., et al., Survey of commercially available explosives detection technologies and equipment 2004, Sandia National Laboratories, 2005.
Verkouteren, J. R., Particle Characteristics of Trace High Explosives: RDX and PETN*, J. Forensic Sci., 52 (2), 2007, 335-340.
Kanu, A. B., et al., Rapid preseparation of interferences for ion mobility spectrometry, Analytica Chimica Acta 610, 2008, 125-134.
Takada, Y., et al., Detection of Military Explosives by Atmospheric Pressure Chemical Ionization Mass Spectrometry with Counter-Flow Introduction, Propellants, Explosives, Pyrotechnics, 27, 2002, 224-228.
Talaty, N., et al., Fabric analysis by ambient mass spectrometry for explosives and drugs, Analyst, 133, 2008, 1532-1540.
Moore, D. S., Instrumentation for trace detection of high explosives, Review of Scientific Instruments, 75, 2004, 2499-2512.
Tao, S., et al., Hierarchically Structured Nanocomposite Films as Highly Sensitive Chemosensory Materials for TNT Detection, ChemPhysChem, 2006, 7, 1902-1905.
Beardah, M. S., et al., Effectiveness of contamination prevention procedures in a Trace Explosives Laboratory, Science & Justice, 47, 2007, 120-124.
Popov, I. A., et al., Detection of explosives on solid surfaces by thermal desorption and ambient ion/molecule reactions, Chem. Commun., 42, 2005, 1953-1955.
Na, N., et al., Direct detection of explosives on solid surfaces by mass spectrometry with an ambient ion source based on dielectric barrier discharge, Journal of Mass Spectrometry, 42, 2007, 1079-1085.
Moore, D. S., Recent Advances in Trace Explosives Detection Instrumentation, Sens. Imaging, 8, 2007, 9-38.
Waddell, R., et al., Determination of nitroaromatic and nitramine explosives from a PTFE wipe using thermal desorption-gas chromatography with electron-capture detection, Journal of Chromatography, A, 1062, 2005, 125-131.
Sigman, M. E., et al., In-Injection Port Thermal Desorption for Explosives Trace Evidence Analysis, Analytical Chemistry, 71 (19), 1999, 4119-4124.
Harvey, S. D., et al., Selective sampling with direct ion mobility spectrometric detection for explosives analysis, Int. J. Ion Mobil. Spec, 12, 2009, 115-121.
Koyuncu, H., et al., Examination of Some Organic Explosives by Ion Mobility Spectrometry (IMS), Turk. J. Chem., 29, 2005, 255-264.
Eiceman, G. A., Quantitative calibration of vapor levels of TNT, RDX, and PETN using a diffusion generator with gravimetry and ion mobility spectrometry, Talanta, 45, 1997, 57-74.
JPS Composite Materials databook, http://jpsglass.com/, Jul. 3, 2013.
Lubin, G., Handbook of Fiberglass and Advanced Plastics Composites, Robert E. Krieger Pub. Co., Huntington, N.Y., 1969, p. 894.
Bjorksten, J., et al., Polyester Resin—Glass Fiber Laminates, Industrial and Engineering Chemistry, 46 (8), 1954, 1632-1635.
Zhang, H.-X., et al., Electrochemical Sensor for Detecting Ultratrace Nitroaromatic Compounds Using Mesoporous SiO2-Modified Electrode, Analytical Chemistry, 78 (6), 2005, 1967-1971.
An, F., et al., Adsorption of 2,4,6-trinitrotoluene on a novel adsorption material PEI/SiO2, Journal of Hazardous Materials, 166, 2009, 757-761.
An, F., et al. Adosrption mechanism and property of a novel adsorption material PAM/SiO2 towards 2,4,6-trinitrotoluene, Journal of Hazardous Materials, 168, 2009, 352-357.
Ania, C. O., et al., Importance of Structural and Chemical Heterogeneity of Activated Carbon Surfaces for Adsorption of Dibenzothiophene, Langmuir, 21, 2005, 7752-7759.
Dabrowski, A., et al., Adsorption of phenolic compounds by activated carbon—a critical review, Chemosphere 58, 2005, 1049-1070.
Vasilyeva, G. K., et al., Catalytic oxidation of TNT by activated carbon, Chemosphere, 47, 2002, 311-317.
Marinovic, V., et al., Dynamic adsorption of trinitrotoluene on granular activated Carbon, Journal of Hazardous Materials B117, 2005, 121-128.
An, F., et al, Adorption performance and mechanism of 2,4,6-trinitrotoluene on a novel adsorption material polyvinylbenzyl acid/SiO2, Applied Surface Science, 255, 2009, 5031-5035.
Feng, J., et al., Conjugated polymer-grafted silica nanoparticles for the sensitive detection of TNT, Sensors and Actuators, B 145, 2101, 438-443, 2010.
Gao, D., et al., Resonance Energy Transfer-Amplifying Fluorescence Quenching at the Surface of Silica Nanoparticles toward Ultrasensitive Detection of TNT, Analytical Chemistry, 80 (22), 2008, 8545-8553.
Gao, D., et al., A Surface Functional Monomer-Directing Strategy for Highly Dense Imprinting of TNT at Surface of Silica Nanoparticles, J. Am. Chem. Soc., 129, 2007, 7859-7866.
Lee, C. H., et al., Stationary phases, 3. Preparation and characterization of pentafluorophenyldimethylsilyl stationary phase, Fresenius Z. Anal Chem. 328, 1987, 37-40.
Xie, C., et al., Molecular Imprinting at Walls of Silica Nanotubes for TNT Recognition., Analytical Chemistry, 80 (2), 2008, 437-443.
Yildirim, A., et al., Template-Free Synthesis of Organically Modified Silica Mesoporous Thin Films for TNT Sensing, Applied Materials and Interfaces, 2 (10), 2010, 2892-2897.
Greathouse, J. A., et al., Computational screening of metal-organic frameworks for large-molecule chemical sensing, Physical Chemistry Chemical Physics, 12, 2010, 12621-12629.
Ikkala, O. T., et al., Possible polyaniline complexes due to molecular recognition supramolecular structures based on hydrogen bonding and phenyl stacking, Synthetic Metals, 84, 1997, 55-58.
Reddy, S., et al., Variable-Temperature Powder X-ray Diffracton of Aromatic Carboxylic Acid and Carboxamide Cocrystals, Chem. Asian J., 2, 2007, 505-513.
Tabrizchi, M., et al., Detection of explosives by positive corona discharge ion mobility spectrometry, Journal of Hazardous Materials, 176, 2010, 692-696.
Haensch, C., et al., Chemical modification of self-assembled silane based monolayers by surface reactions, Chemical Society Reviews, 39, 2010, 2323-2334.
Onclin, S., et al., Engineering Silicon Oxide Surfaces Using Self-Assembled Monolayers, Agnew. Chem. Int. Ed., 44, 2005, 6282-6304.

* cited by examiner

Isocyanate

Fluoroalkyls/
Fluoroalcohols

Thiophenyl

Ethylene
Diamine

Beta-Diketone

Beta-Diketone with
coordinated metal
and ligands

Bipyridyl 1,10-phenanthroline

Phenylfluoroalcohol

Iminodiacetic Acid (IDAA)

Diphosphonic Acid (diphos)

Ethylenediamine
Tetraacetate 3,4-hydroxypyridinone
(HOPO)

RDX

TETRYL

TNT

EGDN

PETN 2,6-DNT

*n*-Pentylnitrate (PN)

1-Nitrobutane (NB)

2,4-DNT

TATP

NG

4-NT

Lidocaine

Cocaine

Methamphetamine

Fentanyl

Pentobarbital

Heroin

VX

DMMP

Demeton-S-methyl

Soman (GD)

Sulfur Mustard (HD)

Parathion

Malathion

ENHANCED SURFACE SAMPLER AND PROCESS FOR COLLECTION AND RELEASE OF ANALYTES

STATEMENT REGARDING RIGHTS TO INVENTION MADE UNDER FEDERALLY-SPONSORED RESEARCH AND DEVELOPMENT

This invention was made with Government support under Contract DE-AC05-76RLO1830 awarded by the U.S. Department of Energy. The Government has certain rights in the invention.

FIELD OF THE INVENTION

The present invention relates generally to surface sampling and methods for detection of analytes. More particularly, the invention relates to an enhanced surface sampler, method of making, and process for collection and release of selected analytes.

BACKGROUND OF THE INVENTION

Current state of the art for trace detection of explosives, chemical and biological threat agents, and other threat agent signatures often requires physical swipes of surfaces to be collected for further on-site or remote instrumental analysis. Collection and subsequent assays of minute amounts of analytes such as explosive residues from surfaces is a primary method for detection of hidden explosives or discovery of residues on persons who have had contact with explosives. For example, collection of trace residues from surfaces is typically conducted by physically sampling surfaces with cotton or muslin swipe materials and swabs. Muslin is a woven cotton cloth that is a widely used surface sampling material for collection of trace explosives and other analyte samples. Explosives detection depends on the effectiveness of the measurement as well as the collection efficacy. Performance of the sampling material is fundamental to the analytical process upon which the entire detection and decision sequence depends.

Presence of trace explosives on swipes can be analyzed by various instruments. Ion mobility spectrometry (IMS) is a principle method presently employed in the field. Recovery of the analyte from the sampling media can be accomplished by rinsing with solvents or by heating the sampling media to introduce the analyte into the instrument for subsequent assay. IMS enables rapid analysis, has low detection limits for many analytes of interest, has a low operating cost, and requires no sample preparation. Consequently, IMS is one of the most widely used analytical methods for explosives detection throughout the world. However, IMS can produce erroneous results due to its lack of selectivity, susceptibility to interference, as well as nonlinear behaviors including, e.g., sample reproducibility issues, and human error. Thus, improving sample collection and analyte introduction into the IMS (and similar systems) should improve sensitivity; stability, and potentially selectivity, thereby resolving many fundamental problems presently plaguing field-deployed instruments that are tasked with trace detection of organics.

While effective, muslin sampling cloths made of cellulosic fibers are not ideal sampling materials. Cellulose fibers include a range of chemical moieties that result in heterogeneous binding of analytes, which can result in distributed or incomplete analyte release. Further, unprocessed muslin sampling swabs contain non-cellulosic compounds found in native cellulosic fibers (i.e. waxes, natural oils and starches) as well as sizing agents and lubricants added during and after textile processing. Processes typically, used to remove these impurities in industry such as mechanical scouring, chemical scouring agents, and enzymatic methods can weaken the cellulosic fibers and render them unsuitable for repeated use due to degradation. The decomposition and degradation of an unstable swab material can release contaminants into a detection instrument and therefore interfere with the sample analysis and negatively impact the detection process. Additionally, cellulosic fibers have a limited thermal stability as they decompose at the relatively low temperature of 150° C. And, the high specific heats (>1.3 J/g ° C.) and low thermal conductivity (~0.24 W/m-K) of cellulosic fiber materials combined with the chemical heterogeneity of the surface result in less than optimal release of analytes from the surface, which can limit the detection performance.

Recently, different materials have been evaluated as candidates for surface sampling including, e.g., raw glass fibers, polytetrafluoroethylene (PTFE) fibers, and aromatic polyamide polymer fibers. These materials have a high thermal stability that allows thermal desorption of an analyte into an IMS. They are also resistant to mechanical and shredding stresses, and offer a high desorption efficiency for several explosive compounds. However, while PTFE has some suitable properties (e.g., is not wetted by water), PTFE has a lower efficiency for collection of explosives than muslin or cotton swabs. And, tests on simple glass fiber materials show they do not retain sufficient structural integrity and degrade during use.

Accordingly new swipe samplers and preparation processes are needed that are physically and thermally stable, enhance analyte adsorption and collection, and provide excellent desorption of analytes for detection, e.g., of explosives and other threat agents. The present invention addresses these needs.

SUMMARY OF THE INVENTION

An enhanced swipe, sampler and processes of making and using are described that improve collection and enhance sensitivity for trace level detection of target analytes including explosives and other threat agents. The swipe sampler may include a fabric of a selected thickness composed of selected glass and/or metal fibers (with an oxide coated surface). The fibers can have silane ligands covalently attached to the fibers, which yields a functionalized surface on the surface of the fabric. The fabric collects and retains an analyte(s) thereon upon contact with same.

A method of making is also described. The method may include: silanizing a fabric of a selected thickness comprising selected glass and/or metal fibers (with an oxide coated surface) therein by directly (e.g., covalently) attaching selected silane ligands to the surface of the fibers to functionalize the surface of the fabric. The fabric may be configured to collect and retain an analyte(s) on the surface of the fabric upon contact with the analyte(s).

A method of use is also described. The method may include: collecting an analyte(s) on a fabric that includes glass and/or metal fibers (with an oxide coated surface) therein having silane ligand(s) with terminal group(s) directly (e.g., covalently) attached to surfaces of the fibers. The method may also include releasing the analyte(s) from the surface of the fabric for detection of the analyte(s).

In some embodiments, the fabric of the enhanced sampler includes glass fibers. In some embodiments, the fibers are composed of or include a glass selected from: A-type glasses (e.g., alkali-lime glass with little or no boron oxide); E-type glasses; E-CR-type glasses (e.g., alumino-lime silicate with less than 1% w/w alkali oxides with high acid resistance); C-type glasses (e.g., alkali-lime glass with high boron oxide content); D-glass (borosilicate glass with high dielectric constant); R-glass (alumino silicate glass with no MgO or CaO); S-type glasses (e.g., alumino silicate glass without CaO but with high MgO content with a high tensile strength), including combinations of these various glasses. In some embodiments, the sampler includes pure silica fibers, E-glass fibers, S-glass fibers, or combinations of these fibers.

In some embodiments, the sampler may include metal-containing fibers such as those with an oxide coating on the surface of the fibers. In some embodiments, the fabric, may include fibers that include, or are composed of, e.g., a metal oxide.

In some embodiments, the fabric of the sampler includes fibers with a thickness between about 0.01 mm and about 1 mm; or between about 0.05 and about 0.15; or between about 0.01 mm and 0.20 mm; or between about 0.01 mm and about 0.10 mm.

In some embodiments, the fibers in the fabric include a weave or pattern. Fabric weaves include, but are not limited to, e.g., duraweaves, intraweaves, twill weaves, satin weaves, hybrid weaves, plain weaves, warp weaves, drape weaves, weft weaves, real weight weaves, braid weaves, and combinations of these various weaves. In some embodiments, the fibers are spunlaced fibers. In some embodiments, the fibers are woven fibers or patterned fibers.

In some embodiments, the silane ligands are selected from silanes, alkoxysilanes, silanols, or combinations of these various ligands. The silane ligands may include a terminal group that enhances the affinity of the fabric to collect and retain analytes on the fabric surface. In some embodiments, the silane ligands with a terminal group attached provides an affinity for the analyte(s) greater than the affinity provided absent the terminal group. In some embodiments, the terminal group attached to the silane ligand is an amide group, an ester group, an alkyl group containing 1-18 linear or branched carbons, or a combination thereof. In some embodiments, the terminal group attached to the silane ligand is a fluoroalcohol or fluoroalkyl containing 1 to 18 linear or branched carbons. In some embodiments, the terminal group attached to the silane ligand is a perfluoroalkane, an oligomeric imide, or a combination of these two terminal groups. In some embodiments, the terminal group is selected from the group consisting of: methyl, phenyl, hydroxyphenyl, alkoxyphenyl, aminophenyl, nitrophenyl, thiophenyl, alkylthiophenyl, furanyl, alkylfuranyl, cyano, isocyanato, fluoroalkyl, amines, alkyl amines, and combinations thereof. In some embodiments, the terminal group attached to the silane ligand is an alkyl amine that includes 1 to 6 carbons. In some embodiments, the terminal group attached to the silane ligand includes: ethylenediamine tetraacetate (EDTA); ethylene diamine (EDA); diethylenetriamine (DETA); 1,10-phenanthralene; a beta-diketone; a 2,2'-bipyridyl; or a combination thereof. In some embodiments, the terminal group attached to the silane ligand is a beta-diketone including, but not limited to, e.g., 2-thenoyltrifluoroacetone; 2,4-pentanedione; 1,1,1-trifluoro-2,4-pentanedione, including combinations thereof. In some of these embodiments, the terminal group may further include a cation selected from: Cerium (Ce), Samarium (Sm), Europium (Eu), Tellurbium (Tb), Copper (Cu), Zinc (Zn), Chromium (Cr), Manganese (Mn), Iron (Fe), or a combination thereof. In some embodiments, the terminal group attached to the silane ligand is selected from: 1,2-hydroxypyridinone (HOPO), iminodiacetic acid (IDAA), diphosphene (diphos), an analogue thereof, or a combination thereof.

In some embodiments, the fabric of the sampler has a thermal conductivity greater than about 0.5 W/m-K.

In some embodiments, the fabric of the sampler has a specific heat below about 1.3 J/g ° C.; or between about 1 J/g ° C. and about 1.3 J/g ° C.; or between about 0.5 J/g ° C. and about 1.2 J/g ° C.; or between about 0.1 J/g ° C. and 0.5 J/g ° C.

In some embodiments, the method of making further includes stabilizing the fabric to prepare the fabric for collection of the analyte(s). In some embodiments, the stabilizing includes heating the fabric at a temperature of at least about 180° C. under vacuum for a time up to about 18 hours or greater.

In some embodiments, the method of making further includes pretreating the fibers of the fabric prior to silanizing to increase the density of silanols on the surface of the fibers that are reactive with the silane ligands. In some embodiments, the pretreating includes a method such as calcining, refluxing in a solvent(s), contacting with alkaline solution, contacting with acid solution, heating, or combinations of these pretreating methods. In some embodiments, the contacting may include a concentration of base or acid up to about 10M and a contacting time of up to about 4 hours.

In some embodiments, the silanizing includes covalently attaching silane ligands that include a selected terminal group chemically attached to the silane ligands. In some embodiments, the silanizing includes covalently attaching silane ligands without a selected terminal group directly attached to the silane ligands. In some embodiments, the silanizing includes covalently attaching silane ligands absent a terminal group chemically attached to the silane ligands. In some embodiments, the terminal group is chemically attached subsequent to the attachment of the silane ligands. In some embodiments, the silanizing is performed one or more times with the same or different silane ligands. In some embodiments, the silanizing includes refluxing the fabric in a solution containing at least one solvent and at least one silane ligand. In some embodiments, the silanizing with at least one solvent includes at least one organic solvent or at least one aqueous solvent. In some embodiments, the refluxing includes a time up to about 18 hours or greater and a temperature of at least about 180° C. In some embodiments, the silanizing includes an aqueous solution deposition method or a gas-phase deposition method. In some embodiments, the silanizing includes refluxing the fabric in a solvent containing a selected silane for a time sufficient to chemically bind the silane to the fibers to functionalize the surface. The functionalized surface may then be dried to condition the fabric for collection of one or more target analytes. In some embodiments, the silane has a concentration of about 10 wt % in toluene. In some embodiments, the refluxing is performed for a time of at least about 18 hours. In some embodiments, drying is performed at a temperature of at least about 180° C. for about 18 hours under vacuum. In some embodiments, the method can include rinsing the refluxed fabric with one or more aliquots of toluene to remove unbound silane from the functionalized surface. In some embodiments, the method can include rinsing the refluxed fabric with one or more aliquots of methanol to remove contaminants from the surface of the fabric.

In some embodiments, the method of making may further include post-treating the fabric following silanizing with a selected solvent(s) to remove unbound silane ligands or impurities from the surface of the fabric.

In some embodiments, the sampler has a sampling surface with a shape selected from: round, oval, rectangular, square, triangular, or combinations of these various shapes. In some embodiments, the sampling surface may have the form of a finger glove or a sampling glove. In some embodiments, the sampling surface may be attached to, or separate from, the finger glove or sampling glove.

In some embodiments, collecting the analyte(s) includes contacting a sampling surface to collect the analyte(s) on the surface of the fabric.

In some embodiments, the surface of the swipe sampler fabric retains the analytes until thermally released at a release temperature greater than the collection temperature into a downstream analytical instrument. In some embodiments, the releasing includes thermally desorbing the analyte(s) at a temperature between about 100° C. and about 500° C. In some embodiments, the releasing includes a concentration of the analyte(s) equal to or greater than the concentration released from a muslin-containing material of equal thickness. In some embodiments, the releasing includes detecting the analyte(s) in an ion mobility instrument with a signal intensity for the analyte(s) at least equal to, or greater than, the signal intensity of the analyte(s) obtained from a muslin-containing material at an equivalent analyte(s) mass. In some embodiments, the releasing includes detecting the analyte(s) in a thermal desorption instrument such as a thermal desorption gas chromatograph (GC) or a thermal desorption ion mobility spectrometer (IMS).

In some embodiments, the releasing includes releasing the analyte(s) from the surface of the fabric by contacting the surface with a solvent or a mixture of solvents. In some embodiments, the releasing includes cleaning the surface of the fabric to prepare the fabric for re-use or collection of another analyte(s) from a selected surface.

In some embodiments, the decomposition temperature of the functionalized fiber surface is greater than about 400° C.

The enhanced swipe sampler addresses previously unsolved issues with physical sampling known in the art including, e.g., high consumable costs, sample reproducibility issues, human error, and enhanced sensitivity for analytes that enable practical use of automated technologies.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION

Enhanced swipe samplers and a method of making are described that improve collection and sensitivity improvements for trace level detection of target agents including explosives, threat agents, and other materials known to be associated with criminal or terror-related activities. While preferred embodiments of the present invention will now be described, the invention is not intended to be limited thereto. From the description, it will be apparent that various modifications, alterations, and substitutions may also be made without departing from the scope of the invention as set forth in the claims listed hereafter. For example, while the invention will be described in reference to detection of explosives, the invention is intended to cover various illicit drugs, chemical weapons, and other threat agents. Accordingly, the description of the preferred embodiments should be seen as illustrative only and not limiting.

Figure 1A:
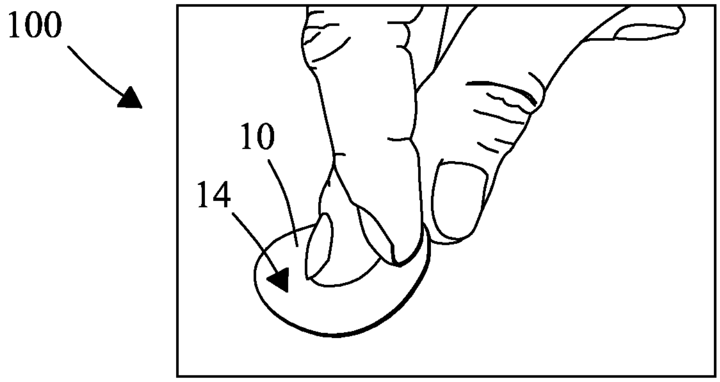
FIGS. 1*a*-1*d* show different embodiments of enhanced surface samplers for collection and retention of selected analytes.
Figure 1B:
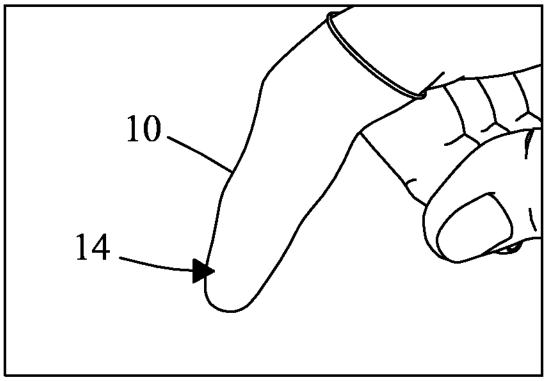
Figure 1C:
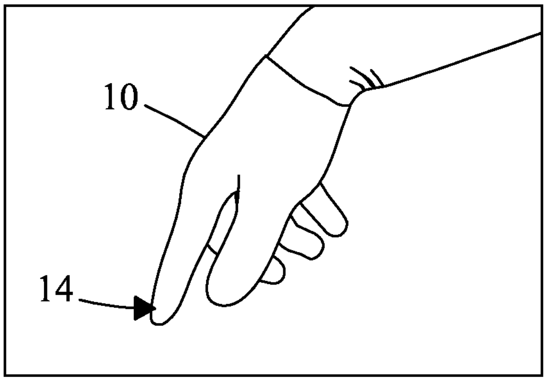
Figure 1D:
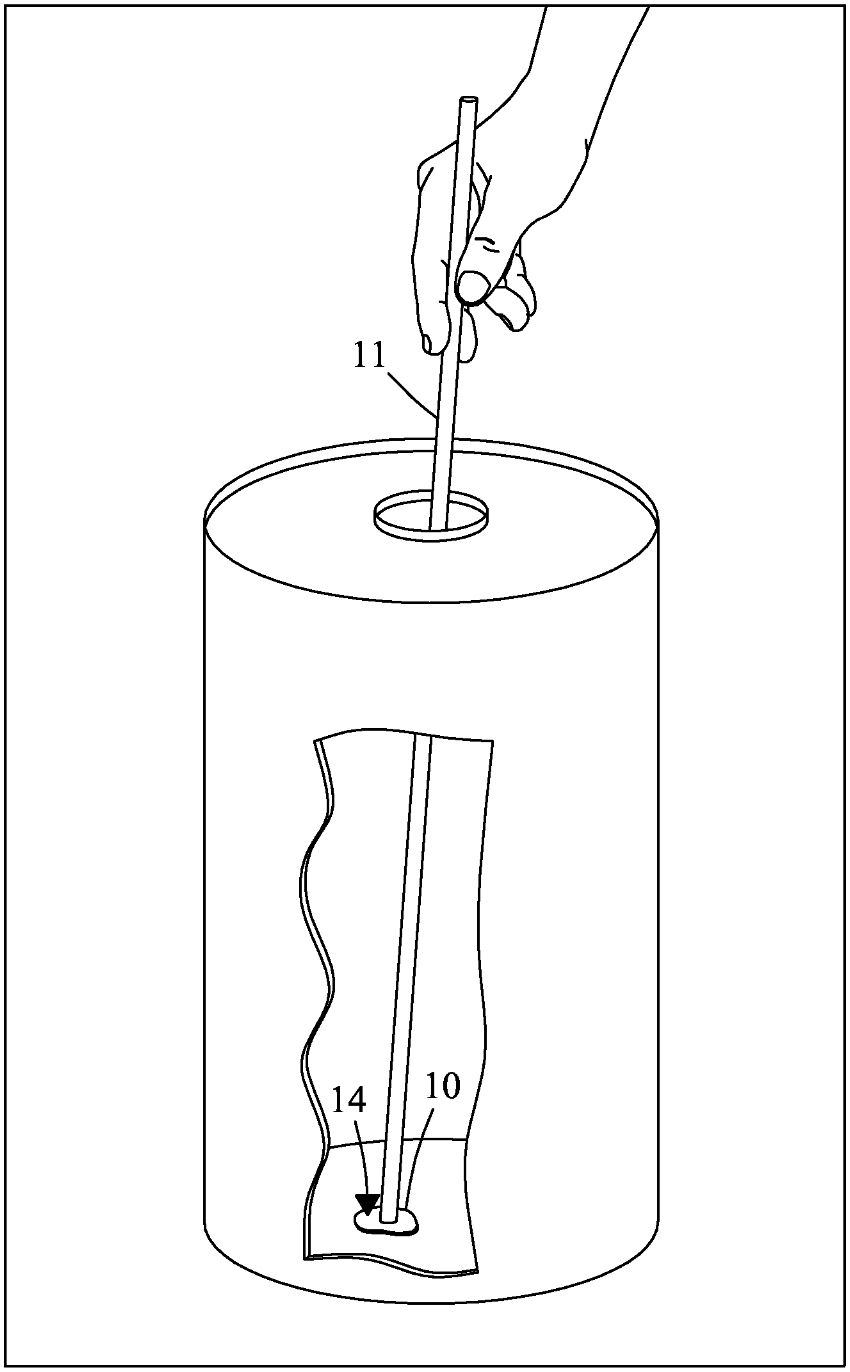

FIGS. 1*a*-1*d* show enhanced surface samplers 100 that provide for collection, retention, and release of selected analytes. In FIG. 1*a*, surface sampler 100 includes a fabric 10 with a sampling surface 14 that is chemically functionalized or modified as described further herein to enhance collection, retention, and release of various target analytes including, but not limited to, e.g., explosives, drugs, and various threat agents. Sampler 100 retains the analytes until they are released, e.g., for detection in a detection instrument. FIG. 1*b* shows that in some embodiments, sampling surface 14 of sampler 100 may be in the form of a finger glove. FIG. 1*c* shows another embodiment in which sampling surface 14 of fabric 10 of sampler 100 may be in the form of a multi-finger sampling glove. In various embodiments, the fabric 10 sampling surface 14 of sampler 100 may include a shape selected from: round, oval, rectangular, square, triangular, or combinations of these various shapes. FIG. 1*d* shows another embodiment in which sampler 100 may be of an attachable/detachable type that may be attached, e.g., to an extension 11 such that sampling surface 14 of fabric 10 of sampler 100 may be in contact with, or that facilitates collection of, analytes in various locations. Locations include, but are not limited to, e.g., cargo surfaces, luggage surfaces (e.g., suitcases, briefcases, etc.), clothing surfaces (e.g., shoes and other clothing, etc.), computer surfaces (e.g., laptop surfaces, etc.), containers (e.g., external and/or internal surfaces of cargo, canisters, tanks, crates, boxes, including contents of such containers), countertop surfaces, floor surfaces, wall surfaces, ceiling surfaces, surfaces in physically inaccessible locations, including combinations of these various locations. No limitations are intended.

Sampler Materials

The fabric of enhanced samplers may be constructed of fibers that include, or are composed of, various types of glass, silica, non-metal oxides, oxide-coated metals, metal oxides, and/or metals coated with metal-oxides described further herein.

In some embodiments, fabric may include glass fibers composed of pure silica (e.g., ASTROQUARTZ®, JPS Composites Materials, Anderson, S.C., USA), or glass of various types. In some embodiments, fabric may include S-glass fibers, E-glass fibers (BGF Industries, Inc., Greensboro, N.C., USA), or a combination of these glass types. In other embodiments, the fabric may include glass fibers that include, or that are coated with, metal oxides and/or non-metal oxides.

Metals include, but are not limited to, e.g., iron (Fe), aluminum (Al), copper (Cu), nickel (Ni), silver (Ag), including alloys thereof. In some embodiments, metal fibers may be treated with acid or base to clean and activate the surface of the fibers prior to silanization. In some embodiments, metal fibers may include a native oxide coating prior to silanization or installation of silane ligands on the surface of the metal fibers.

In some embodiments, the fabric may include fibers that are composed of, or that include, metal oxides, oxide coated metals, or metals that include a metal oxide coating of the same or different metal provided that refractory properties of the metal oxide coating are compatible with the underlying metal in the fiber. Metal oxides and non-metal oxides include, but are not limited to, e.g., $Ag_2O$, $Al_2O_3$, $As_2O_3$, $As_4O_6$, BaO, $B_2O_3$, BeO, $Bi_2O_3$, CO, CaO, CdO, $CeO_2$, CoO, $CrO_3$, $Cr_2O_3$, CuO, $Cu_2O$, $Dy_2O_3$, $Er_2O_3$, $Eu_2O_3$, FeO, $Fe_2O_3$, $Ga_2O_3$, $GdO_3$, $GeO_2$, $Ho_2O_3$, $HfO_2$, $In_2O_3$, $IrO_2$, $K_2O$, KNaO, $La_2O_3$, $Li_2O$, $Lu_2O_3$, MgO, MnO, $MnO_2$, $Mn_2O_3$, $MoO_3$, $N_2O_5$, $Na_2O$, $Nb_2O_3$, $Nb_2O_5$, $Nd_2O_3$, NiO, $Ni_2O_3$, $PO_4$, PbO, PdO, $PmO_3$, $PrO_2$, $Pr_2O_3$, $PtO_2$, $Rb_2O$, $Re_2O_7$, $RhO_3$, $SO_3$, $SO_4$, $Sb_2O_3$, $Sb_2O_5$, $Sc_2O_3$, $SeO_2$, $SiO_2$, $Sm_2O_3$, $SnO_2$, $Ta_2O_5$, $Tb_2O_3$, $ThO_2$, $TiO_2$, $Tl_2O$, $Tm_2O_3$, $V_2O_5$, $WO_3$, $Y_2O_3$, $Yb_2O_3$, ZnO, ZrO, $ZrO_2$, including combinations of these various oxides. Other minor constituents commonly found in glasses may also be found therein which are unlikely to influence the properties of the overall material including, e.g., alkali metal oxides, alkaline earth oxides, and impurities.

Sampler Thickness

Enhanced samplers have a selectable thickness (height dimension). In some embodiments, thickness of the samplers may be between about 0.01 mm and about 1 mm. In some embodiments, thickness of the samplers may be between about 0.05 mm and about 0.15 mm. In some embodiments, thickness of the samplers may be between about 0.05 mm and about 0.20 mm. In some embodiments, thicknesses of the samplers may be between about 0.01 mm and about 0.10 mm. No limitations to selected thicknesses are intended. "Thick" as used herein refers to a thickness of about 2 mm. "Medium" as used herein refers to a thickness of about 0.2 mm to about 2 mm. "Thin" means a thickness of about 0.01 mm to about 0.2 mm. No limitations are intended.

Patterns and Weaves

Fibers in the sampler fabric can include various weaves, patterns, and thicknesses that optimize the collection, retention, and release of analyte(s) from the sampling surface. For example, patterns and weaves of the sampler may be selected that provide a suitable surface roughness and flexibility that optimize collection and retention of analytes from surfaces. Weaves and patterns may also be selected that provide for gas permeation, desorption (e.g., thermal desorption), solvent extraction, and/or uniform release of analytes from the sampler. In addition, weaves and patterns of fibers within the fabric can increase the strength and the durability of the fabric. Weaves include, but are not limited to, e.g., duraweaves, intraweaves, twill weaves, satin weaves, harness satin weaves (e.g., 4HS, 8HS, and the like), hybrid weaves, plain weaves, warp weaves, drape weaves, weft weaves, real weight weaves, braid weaves, other weaves, including combinations of these various weaves. No limitations are intended.

Physical Properties

Samplers include a sampling surface that is chemically-modified or chemically functionalized to provide enhanced physical, chemical properties compared with cellulose-based materials such as muslin cloth and cotton. Physical properties include, but are not limited to, e.g., fiber composition, fiber strength, fiber length, fiber diameter, metal oxide composition; affinity for collection, retention, and release of analytes; surface homogeneity; thermal conductivity; specific heat; thickness, weave or pattern, durability, number of surface hydroxyls available for functionalization; and combinations of these various properties. Surface-modified fabrics may also include an engineered structure with selectable features. Engineered features include, but are not limited to, e.g., weave, surface roughness, fiber thickness, fiber length, fiber density, gas permeability, and other properties that enable preferred physical properties of the fabric to be selected. Surface-modified fabrics can also be made to resist repeated mechanical stresses and thermal treatment, which allows for repeated reuse.

TABLE 1 compares selected physical properties of glass, silica, and metal-containing fibers to those of conventional (0.26-0.32 mm thickness) cotton and muslin materials.

TABLE 1

Physical Properties Data.

| Material | Thermal Conductivity (W/m-K) | Specific heat capacity (J/g-° C.) | Electrical Resistivity (Ω-cm) |
|---|---|---|---|
| Cotton$^A$ | 0.071 | 1.335 | |
| Cellulose$^B$ | 0.242 | 1.338 | |
| Polytetrafluoroethylene$^C$ | 0.25 | 1.00 | $>10^{18}$ |
| Polyamide Polymers$^C$ | 0.23-0.29 | 1.26-1.70 | $>10^{13}$ |
| Silica$^D$ | 1.30 | 0.937 | |
| E-glass Fiber$^{E,F}$ | 1.28-1.32 | 0.780-0.820, 0.803 | |
| S-glass Fiber$^{E,F}$ | 1.44-1.46 | 0.720-0.750, 0.736 | |
| Nichrome V$^G$ | 14.0 | 0.480 | $1.18 \times 10^{-4}$ |
| Stainless Steel$^{G,H}$ | 16.2, 10.0-30.0 | 0.500, 0.200-0.620 | $7.40 \times 10^{-5}$ |
| Titanium$^G$ | 17.0 | 0.528 | $5.54 \times 10^{-5}$ |
| Nickel$^G$ | 60.7 | 0.460 | $6.40 \times 10^{-6}$ |
| Platinum$^G$ | 69.1 | 0.134 | $1.06 \times 10^{-5}$ |
| Iron$^G$ | 76.2 | 0.440 | $8.90 \times 10^{-6}$ |
| Tungsten$^G$ | 163 | 0.134 | $5.65 \times 10^{-6}$ |
| Aluminum$^G$ | 210 | 0.900 | $2.70 \times 10^{-6}$ |

TABLE 1-continued

| Physical Properties Data. | | | |
|---|---|---|---|
| Material | Thermal Conductivity (W/m-K) | Specific heat capacity (J/g-° C.) | Electrical Resistivity (Ω-cm) |
| Gold[G] | 301 | 0.128 (25° C.) | $2.20 \times 10^{-6}$ |
| Copper[G] | 385 | 0.385 | $1.70 \times 10^{-6}$ |
| Silver[G] | 419 | 0.234 | $1.55 \times 10^{-6}$ |

[A]Harris, M., *Harris's Handbook of Textile Fibers*, Harris Res. Lab., Inc., Washington, D.C., 1954.
[B]Curtis, L. J., Miller, D. J., Transport Model with Radiative Heat Transfer for Rapid Cellulose Pyrolysis. Ind. Eng. Chem. Res., 1988, 27, 1783-1788.
[C]Martienssen, W. and Warliment, H (Eds). Springer Handbook of Condensed Matter and Material data, Springer Berlin Heidelberg.: Germany, 2005.
[D]http://www.tekna.com/powder/spherical-powder/silica.html
[E]JPS Composite Materials databook. http://ipsglass.com/
[F]Lubin, G. Handbook of fiberglass and advanced plastics composites, Robert E. Krieger Pub. Co.: Huntington, N.Y, 1969.
[G]MatWeb Material Property Data. http://www.matweb.com/index.aspx
[H]http://www.lenntech.com/stainless-steel-316l.htm As shown in TABLE 1, glass and silica fibers have better thermal properties including a thermal conductivity ~5 times greater, and a specific heat ~½ times lower than cellulosic fiber materials such as muslin or cotton cloth. In some embodiments, glass and/or silica fibers have a specific heat below about 1.3 J/g ° C. In some embodiments, specific heat is between about 1 J/g ° C. and about 1.3 J/g ° C. In some embodiments, specific heat is between about 0.5 J/g ° C. and about 1.2 J/g ° C. Metal-containing fibers have specific heats below about 0.5 J/g ° C. with superior thermal conductivity values relative to cellulosic materials.

Sampling surface may also provide suitable desorption properties for release of collected analytes and organics. For example, fiberglass has physical properties that provide the fabric with its ability to withstand repeated mechanical stresses rendering it suitable for use as a sampling swipe material. Glass and silica fibers are also more durable compared with muslin or cellulosic fibers. Fiberglass fabrics made of these materials are also more physically and chemically stable at high temperatures. These thermal properties enable the enhanced sampling materials of the present invention to heat more quickly and evenly than muslin and cotton cloth, and can result in both uniform and faster thermal desorption of analytes to a detector. The modified fabric can also be thinner (i.e., thickness dimension) than conventional cotton and muslin materials. Thinner materials can provide reduced thermal mass and better gas permeability, which provide faster release and improved transport of desorbed analytes to the detector. Detectors include, but are not limited to, e.g., liquid chromatography (LC) instruments, gas chromatography (GC) instruments, mass spectrometry (MS) instruments, ion mobility spectrometry (IMS) instruments, and combinations of these various instruments including, e.g., thermal desorption gas chromatography mass spectrometers (TD-GCMS) and headspace analyzer gas chromatography mass spectrometers (HA-GCMS).

In addition, sampling surface can be tailored with a specified surface chemistry. The enhanced surface chemistry may provide greater homogeneity and analyte affinity that enables better analyte recovery when compared with the heterogeneous surface chemistry of conventional cellulosic materials. The enhanced surface chemistry can also provide enhanced analyte desorption into the detector or otherwise maximize performance relevant to collection, release, and detection (i.e., signal intensity) of analytes released from the surface of the swipe sampler materials.

I. Surface Pretreatment

Commercially available glass or silica fiber materials are typically coated with a variety of chemicals such as binders, oils, resins, and other compounds that facilitate uses in a variety of industrial applications. Removal of these compounds is preferred in order to install specific surface chemistries at densities that enhance the physical properties of the samplers described herein. For example, untreated glass and/or silica fibers can include many unavailable reactive surface sites because these surface sites are physically obstructed by a surface coating or undesirable contaminants, or are chemically unavailable because of a previous reaction between adjacent silanols (e.g., metal hydroxyl groups) that form, e.g., bridging oxo groups.

Figure 2A:
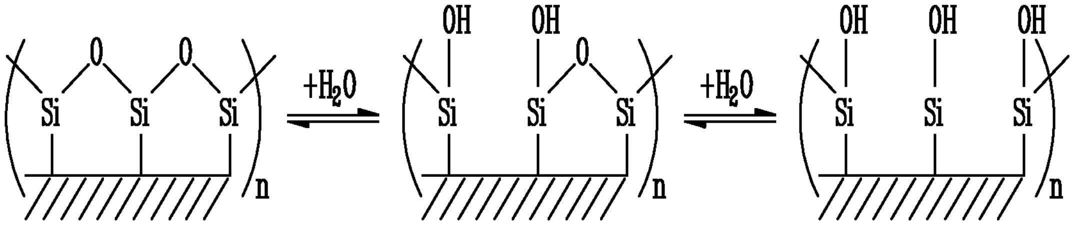
FIG. 2*a* shows a pretreatment process that increases density of reactive groups on the surface of the sampler.

FIG. 2*a* illustrates an exemplary pretreatment process that activates and increases density of reactive groups such as silanols on the surfaces of fibers of the sampler or corrects unfavorable surface chemistry. For example, fibers treated with, e.g., bases or acids can increase the density of silanols on the surfaces of the fibers in the absence of added water. In some embodiments, hydrotreating the surface with an aqueous medium can increase the density of silanols or reactive (—OH containing) groups on the surfaces of the fibers. Reactions are not intended to be limited. As shown in the figure, pretreatment can also reverse unsuitable condensation reactions without damaging the underlying physical structure of the glass, silica, and/or metal-containing fibers thereby maximizing the number of reactive groups (e.g., surface silanols) at the surface of the fibers. In addition, pretreatment can remove unfavorable physical coatings present on as-received materials. Optimizing the number of active sites on the fibers also optimizes the number of silanes that can be subsequently directly (chemically) attached to surface of fibers functionalizing the sampling surface of fabric as detailed hereafter. Activation of surface sites to form reactive silanols is detailed, e.g., by Koyama et al. in U.S. Pat. No. 7,553,574, which reference is incorporated herein in its entirety.

II. Silanization/Functionalization

Figure 2B:
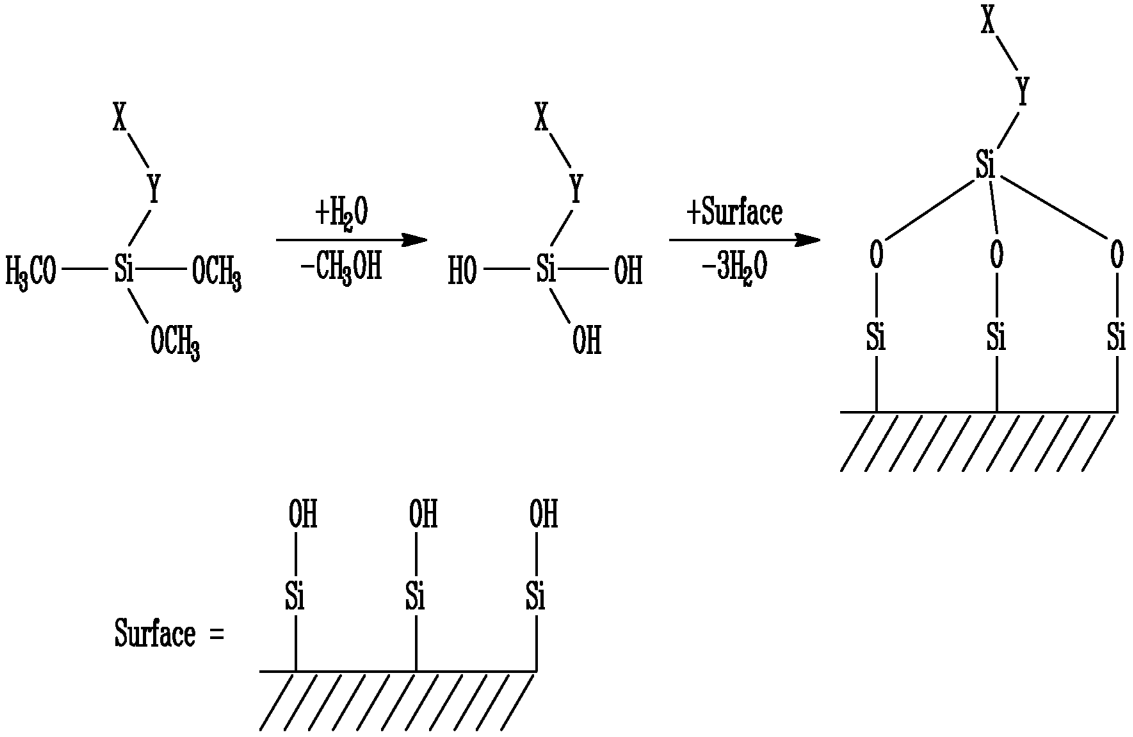
FIG. 2*b* shows an exemplary reaction for direct attachment of silane ligands to fabric fibers.

FIG. 2*b* shows an exemplary condensation reaction for direct attachment of silane ligands or terminally functionalized silane ligands to activated anchor sites (e.g., silanols) on the surfaces of fabric fibers. Samplers including glass, metal oxide, and/or oxide coated glass or metal fibers are amenable to surface functionalization using a wide range of functional groups through Si—O—Si bonds [or metal (M)-O—Si bonds in the case of metal oxide and oxide-coated metal fibers] that form in concert with Anchor groups (Z) attached to a (Si) atom at the terminal attaching end of a Linking group (Y). Another terminal end of the Linking group (Y) may include other terminal groups (X), e.g., as shown in [1] hereafter:

[1]

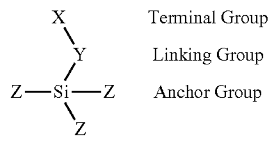

In general, Si—OH groups on the surface of the fibers attach to a (Si) attached at the attaching end of a linking group (Y) via anchor groups (Z) at the attaching end of the (Si). In some embodiments, the silanization process may involve chemically attaching silanes to reactive Si—OH groups on the surface of the fibers. For example, Si—OH reactive sites on the surface of the fibers may attach to selected silane ligands via an anchor group (Z) positioned at the attaching end of the silane ligand. The reaction may form a Si—O—Si bond, e.g., via a condensation reaction. In some embodiments, silanes can attach directly to reactive Si—OH (anchor) groups in the absence of a linking group. Silanization can be performed in the presence of water or in the absence of water. For example, fibers treated with, e.g., bases or acids, can yield hydroxyl ions on the surfaces of the fibers in the absence of added water. Reactions are not intended to be limited.

Figure 3:
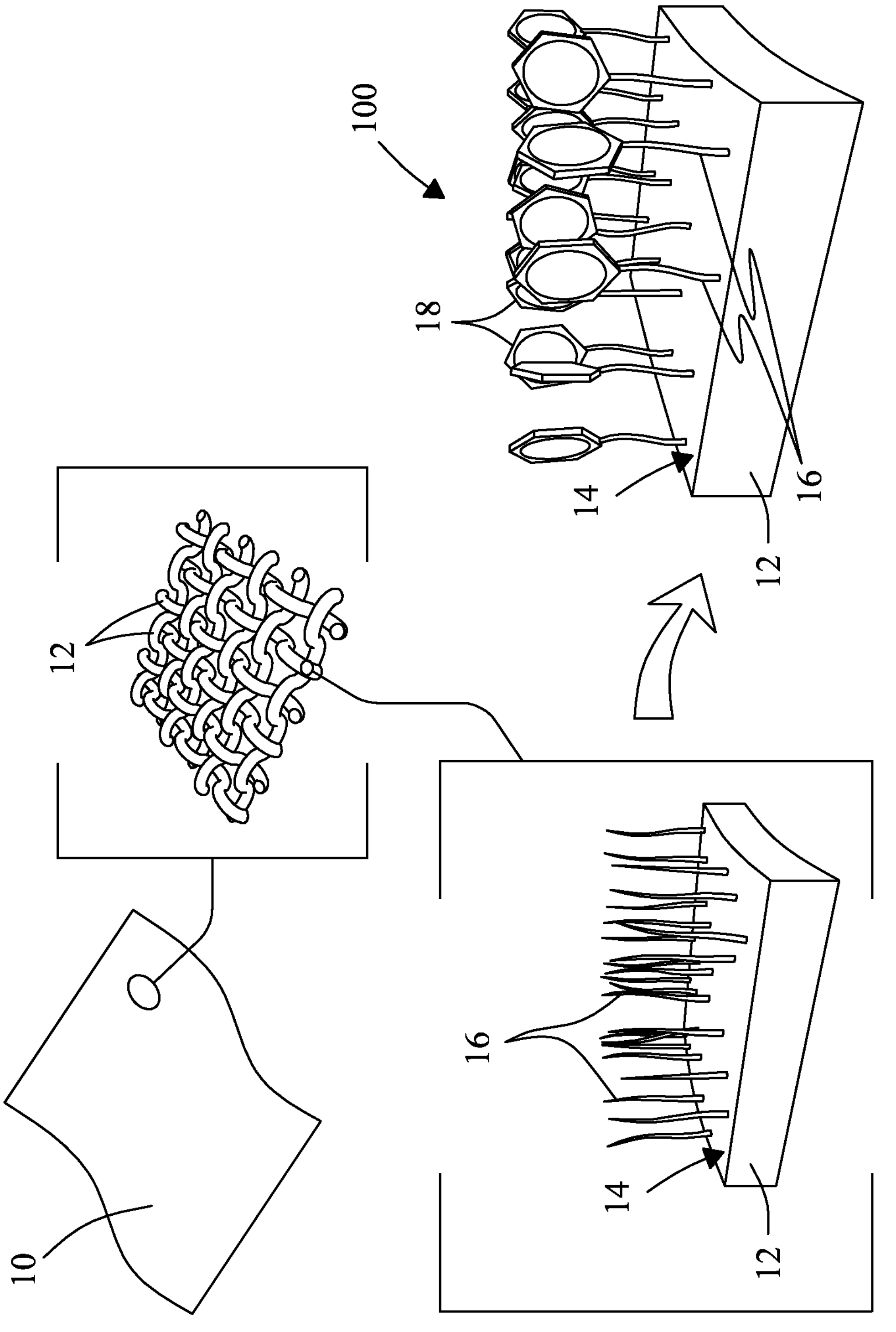
FIG. 3 shows an exemplary flowsheet for functionalization of samplers of the present invention.

FIG. 3 illustrates a simple flowsheet for modification or functionalization of surface samplers 100 in preparation for collection of target analytes. Fibers 12 may include an external sampling surface 14 that can be modified to include various silane ligands 16 directly (e.g., chemically) attached to surface 14 of fibers 12 that functionalizes sampling surface 14. Sampling surface 14 when silanized may further include various and custom terminal functional groups 18 described further herein that can be installed using a range of liquid and gas phase methods. Terminal groups 18 attached to the silane ligands provide a chemical selectivity for various target analytes including explosives (e.g., TNT, nitroaromatics), drugs, and other organic analytes that enhances collection and retention of these various analyte(s) on sampling surface 14. Silane ligands may be chosen that enhance the selectivity or the affinity of the sampling surface 14 toward the target analyte(s). For example, silanes 16 and their functional end groups 18 can be made by considering such factors as size and shape of the analyte. For example, analytes with a long molecular chain align well to non-polar surfaces comprised of alkyl linking and terminal groups. Thus, selection of functional groups containing, e.g., alkanes tied to a silane ligand such as a long-chain alkyl silane can provide an affinity for selective collection and release of such analytes. In other cases, analytes that include flat aromatic groups tend to stack through pi-stacking arrangements. Thus, sampler 100 surfaces 14 containing aromatic terminal groups such as phenyl silanes can allow aromatic analytes to intercalate between the planar aromatic rings at the surface 14 of fibers 12, providing an enhanced capacity to selectively capture and release such analytes. No limitations are intended. All functional and terminal groups as will be selected by those of ordinary skill in the art in view of the disclosure are within the scope of the invention. Polarity of surface 14 and intermolecular forces (e.g., surface energy not restricted to Gibbs Free Energy) of surface 14 can also be considered to predict analyte/surface interactions. In some embodiments, calculational approaches can be used to predict analyte/surface interactions, including, e.g., the Lewis Acidity/Lewis Basicity interactions between the terminal end groups at the sampling surface and the analytes. In other embodiments, matching the types and strengths of intermolecular forces between the terminal end groups at the sampling surface and the target analytes may be considered including, e.g., van der Waals forces, dipolar forces, and hydrogen bonding. No limitations are intended. For example, the surface chemistry selected may be generally applicable to a collection of multiple analytes. Thus, choices of silanes and terminal groups may vary depending on the desired analytes to be collected. All approaches as will be selected by those of ordinary skill in the art in view of the disclosure are within the scope of the invention.

Silane ligands suitable for selective collection of target analytes include, but are not limited to, e.g., phenyl silanes; organosilanes; alkoxysilanes, phenyl-trimethoxysilanes; silanols; multidentate organosilanes containing acidic and/or basic functional groups; multidentate organosilanes that are coordinated to selected metal cations; multidentate organosilanes which may or may not be coordinated through a cation to other organic molecules, including combinations of these various silanes, described further herein.

Passivation (functionalization) of any residual (e.g., unbound or free) reaction sites on the sampling, surface can yield further improvements in surface chemistry results. “Passivation” means that the surface of the fibers is functionalized additional times after an initial functionalization step with: 1) the same silane, 2) with a different silane having different Z-groups (e.g., to allow the different silanes to be positioned in-between the original silane molecules on the surface of the fibers, or 3) with smaller or larger silanes than the original silanes that have different X-groups (e.g., to provide a desirable mixed/non-homogeneous chemistry on the surface of the fibers. For example, passivation using a smaller silane may provide better access to residual surface sites. The term “smaller” refers to the actual volume that the Z-groups take up around the silane silicon (Si) while reacting with the surface of the fibers. For example, as an anchoring (Z) group, $SiCl_3$ may take up a smaller volume than would a $Si(OCH_3)_3$ or similar alkoxysilane. A $SiCl_3$ group could allow silanes containing this Z-group to insert between surrounding or existing silanes and thus to access the surface.

Installation of a typical surface chemistry will be described. While the process will be described with reference to a phenyl silane monolayer (i.e., $1^{st}$ functionalization layer), the invention is not intended to be limited thereto. Various and numerous other suitable surface chemistries can be installed according to other embodiments of the invention. Thus, no limitations are intended.

Phenyl silanes represent an exemplary surface chemistry for modification and functionalization of glass, silica, metal oxide, and/or oxide-coated glass or metal fibers 12 within the sampling fabric 10 material for collection of a wide variety of organics. Phenyl silanes provide a thermally robust and thermally stable surface chemistry at temperatures in excess of 400° C. In addition, phenyl silanes can provide a lipophilic surface with a general affinity for various organic materials, and additionally, greater chemical selectivity for TNT and other nitroaromatics, as detailed further herein.

In some embodiments, installation may involve 1) pretreating as-received glass and silica fibers 12 to remove commercial coatings or surface contaminants, 2) activating the fibers 12 in a base-containing or acid-containing bath to increase the density of active silanol sites on surfaces 14 of fibers 12, 3) silanizing fibers 12 by chemically attaching silanes (e.g., phenyl silanes) on the on surfaces 14 of fibers 12, 4) conditioning (i.e., cleaning) surfaces 14 of the surface-functionalized or modified fiber 12 fabric 10 material, and/or 5) post-treating the surface-modified fabric 10 to remove, e.g., unreacted (or oligomerized but unattached silanes) from fabric 10.

In some embodiments, fiber fabric 10 may be silanized (functionalized) by refluxing the fabric in a fluid containing the selected silanes at a selected temperature, concentration, and time sufficient to chemically bind the silanes to the surface of the fibers. Concentrations are selected that balance 1) the rate at which silane ligands 16 react with silanols or other reactive sites on the surface of the fibers and 2) the rate at which cross-linking reactions between the silanes occurs to form oligomers In typical reactions, an excess quantity of silanes is used to ensure complete coverage at the surface of fibers 12 of the fabric 10. In some embodiments, silanes may have a concentration of about 10 wt % in toluene. No limitations are intended.

In some embodiments, the silanizing may include a condensation reaction. In some embodiments, the silanizing may be done in an aqueous medium using, e.g., an aqueous deposition method. In some embodiments, the silanizing may be done using, e.g., a gas-phase deposition method. In some embodiments, the fluid may be a boiling solvent, e.g., toluene or a mixed solvent. In some embodiments, the temperature for functionalization of the surface is a boiling temperature of the solvent (toluene=110.6° C.). Different and mixed solvents may be employed. Solvents and reflux temperatures may be selected that drive the desired surface reactions at a sufficient rate. For example, without the reflux, the condensation reaction may not occur, which may be undesirable. Times are not limited. In some embodiments, refluxing may be performed for a time of about 18 hours. No limitations are intended.

In some embodiments, the method may include rinsing the refluxed fabric with one or more aliquots of a solvent (e.g., toluene, methanol, and other solvents) or various mixed solvents to remove unsecured, oligomerized, and/or unreacted silanes from the fabric.

In some embodiments, the method can include rinsing the refluxed fabric with one or more aliquots of methanol to re-hydrate the surface of the fibers to secure some silane oligomers on the surface of the fabric.

Overall, results demonstrate that functionalized surfaces are particularly suited for collection of a wide range of chemicals, explosives, organics, and threat agents for assays thereof.

Anchor Groups

Anchor (Z) groups include, but are not limited to, e.g., H; OH; Cl; Br; I; F; siloxanes [e.g., $O(C_nH_{2n+1})$] where n=1-3, including combinations of these anchor groups.

Linking Groups

Linking (Y) groups include, but are not limited to, e.g., alkyl groups ($C_nH_{2n}$) of a linear or branched type, where n=1 to 17; esters [RC(O)OR']; amides [RC(O)NOR'H]; ureas such as [HRNC(O)NR'H] or [RR'NC(O)NR"H]; carbonates [ROC(O)OR']; carbamates [ROC(O)NR']; imides [RC(NR')R"]; ketals [$RC(OR')_2R"$]; and acetals [$RC(OR')_2H$]. Here, R, R', and R" are functional groups of like or different kind, and may further include various other linking groups, anchor groups, and terminal groups, or, simple alkyl groups of the form ($C_nH_{2n+1}$) where n=1-3. No limitations are intended.

Terminal Groups

Figure 4:
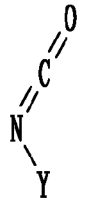
FIG. 4 shows exemplary terminal groups for functionalization of enhanced samplers of the present invention.
Figure 4:
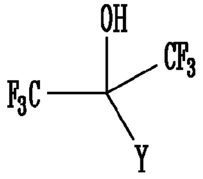
Figure 4:
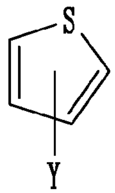
Figure 4:
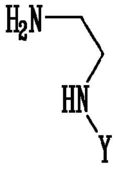
Figure 4:
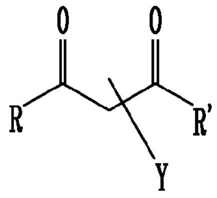
Figure 4:
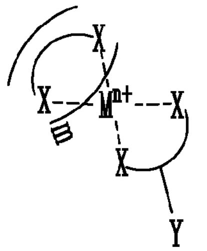
Figure 4:
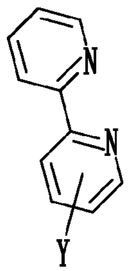
Figure 4:
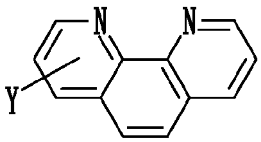
Figure 4:
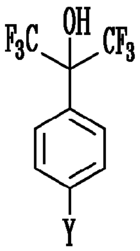
Figure 4:
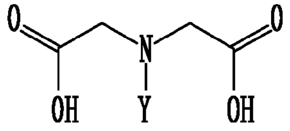
Figure 4:
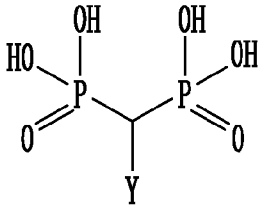
Figure 4:
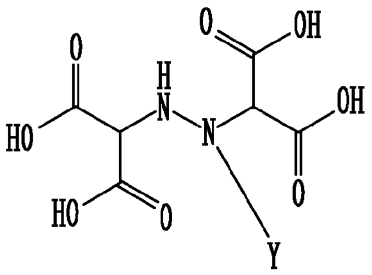
Figure 4:
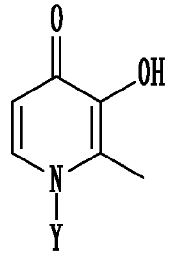

FIG. 4 shows exemplary terminal (X) groups, and possible locations where linking (Y) groups, or where the silicon (Si) of the anchor (Z) group, connect to the terminal (X) group. Terminal groups include, but are not limited to, e.g., alkyls ($C_nH_{2n+1}$) where n=1 to 17 of a linear or branched type; thiols (SH); amines ($NH_2$); hydroxyls (OH); phenyls ($C_6H_5$); nitrophenyls [$(C_6H_{5-n})(NO_2)_n$] where n=1-3; phenylalkanes [$(C_6H_{5-n})R_n$] where n=1-3, R=$C_mH_{2m+1}$ and where m=1-5 (linear or branched); phenols [$(C_6H_{5-n})(OR)_n$] where n=1-3; alkoxyphenyls [$(C_6H_{5-n})(OR)_n$] where n=1-3, R=$C_mH_{2m+1}$ where m=1-5 (linear or branched); phenylamines [$(C_6H_{5-n})(NH_2)_n$] where n=1-3; phenylalkylamines such as [$(C_6H_{5-n})(NRH)_n$] or [$(C_6H_{5-n})(NRR')_n$] where n=1-3, R and R'=$C_mH_{2m+1}$ where, m=1-5 (linear or branched) and R and R' may be of a like or different kind; phenylthiols ($(C_6H_{5-n})(SH)_n$] where n=1-3; phenylalkylthiols [$(C_6H_{5-n})(SR)_n$] where n=1-3 and where R=$C_mH_{2m+1}$ where m=1-5 (linear or branched); cyanate (CN); thiocyanates (SCN); isocyanates (CNO); fluoroalkyls/fluoroalcohols [$C_mH_nF_x(OH)_y$] where m=1-10, and where n=2 m+1-x-y, and where x=0-21, and where y=1-3 (linear or branched); phenylfluoroalcohols [$(C_6H_5)C(CF_3)_2OH$]; thiophenyls ($C_4H_4S$); ethylene diamines [$(NH)C_2H_4(NH_2)$]; beta-diketones [RC(O)CHC(O)R']; bipyridyls of the form [$(C_5H_5N)(C_5H_3N)$]; 1,10-phenanthrolines of the form ($C_{12}H_8N_2$); ethylenediamine tetraacetates ($C_{10}H_{12}N_2O_8$); diphosphonic acids (diphos) [$CH(P(O)(OH)_2)_2$]; iminodiacetic acids (IDAA) [$NCH_2(COOH)_2$]; and 3,4-hydroxypyridinones (HOPO) [$C_5H_2N(O)(OH)CH_3$], including combinations of these various ligands.

In some embodiments, multidentate ligands of the form [$(X_2)_m(M^{n+})X_2$)] may be used including, e.g., beta-diketones, phenanthrolines, or bipyridyls where X=O or N (e.g., in Lewis Base ligand sites), (M) is a coordinated metal selected from, e.g., Ce, Sm, Eu, Tb, Cu, Zn, Cr, Mn, or Fe, where (n) is the charge of the metal ion from (n)=0 to 3; and where (m) is any number of mono-, bi-, or multidentate ligands required to satisfy the coordination of the metal in the coordination sphere. Ligands surrounding the metal may or may not be identical. Thus, no limitations are intended. As will be understood by those of ordinary skill in the art, the general formula takes into account number of available coordination sites (e.g., from about 6 to about 9); the “denticity” (e.g., number of atoms in a single ligand that directly bind to the central atom in a coordination complex) of each ligand (e.g., from about 1 to about 6); the number of ligands involved; and the number of different types of ligands (e.g., from about 1 to about 3). No limitations are intended to any one exemplary structure.

With terminal groups attached to the silanes, other and various terminal groups or ligands can be chemically attached to the terminal end of the silane ligands to provide enhanced affinity and selectivity towards selected analytes. The various surface chemistries represent an advantage as such enhancements do not occur in natural fibers. For example, in some embodiments, surface chemistries can be installed having a better uniformity, selectivity, and affinity that improve analytical performance. Enhancing the collection and subsequent assay of trace amounts of organic residues from surfaces has immediate and significant applications to explosive detection but also has broader utility in forensic, biomedical, and environmental analytical applications.

III. Post-Treatment

Pre-Conditioning

Stabilization of Sampler Surface

Once silanization is complete, sampling surface 14 may be further treated to ensure that silanes are completely bound to the surface and to remove unwanted reactants and side products. This stabilization process prepares the functionalized surface for collection of target analytes. “Stabilization” refers to the completion of surface chemistry reactions that prepare the functionalized surface for collection of target analytes. In some embodiments, the fabric may be thermally cured to stabilize the surface chemistry. When thermally cured, the fabric may be heated in an oven, e.g., a forced-air oven, but is not limited thereto. In one exemplary procedure, curing that finalizes the surface chemistry and prepares the swipe sampler includes heating the fabric to a temperature of between about 200° C. and about 250° C. for a time of between about 5 minutes to about 15 minutes. But, the process is not intended to be limited thereto. In some embodiments, the surface is vacuum dried to prevent further reactions on the surface of the functionalized fibers in the fabric, which readies the surface for collection of target analytes. In some embodiments, drying may be performed at a temperature of at least about 180° C. for about 18 hours under vacuum. Preconditioning does not need to be accomplished "just prior" to use of the sampler.

Stabilization Temperatures

Temperatures for stabilization of the functionalized surface of the enhanced swipe sampler fabrics depend in part on the selected silanes, thermal stability of the silanes, size of the selected silanes, packing density of the selected silanes on the surface of the fibers, or combinations of the various factors. In various embodiments, temperatures are preferably selected that promote cross-linking of silanes positioned adjacent each other on the surface of the fibers in the fabric. In some embodiments, cross-linking between silanes of the functionalized fabric is performed at temperatures between about 120° C. and about 400° C. In some embodiments, the fabric is heated at an oven temperature of at least 120° C. In some embodiments, the fabric is heated at a temperature of at least about 140° C. In some embodiments, the fabric is heated at a temperature of at least about 250° C. In some embodiments, the fabric is heated at a temperature of at least about 300° C. In some embodiments, the fabric is heated at a temperature of at least about 350° C.

Stabilization (Heating) Times

Time required for stabilization will vary depending on the surface chemistry. Suitable stabilization times are those that complete the functionalization of the surface. In some embodiments, stabilization times are in the range from about 1 to about 20 hours. In some embodiments, the fabric is heated for a time of at least about 30 minutes. In some embodiments, the fabric is heated for a time of at least about 60 minutes. In some embodiments, processing times are typically between about 60 minutes and 180 minutes. No limitations are intended.

Analytes

Figure 5:
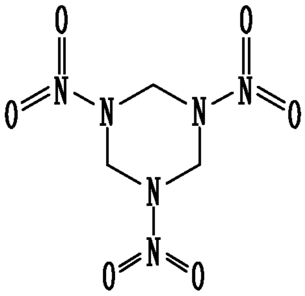
FIG. 5 shows exemplary analytes collected by samplers of the present invention.
Figure 5:
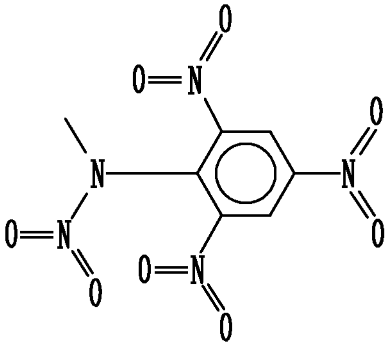
Figure 5:
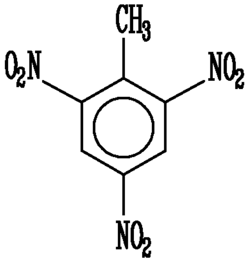
Figure 5:
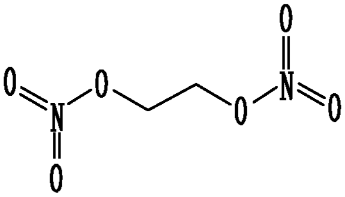
Figure 5:
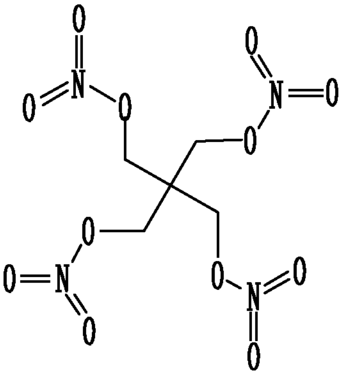
Figure 5:
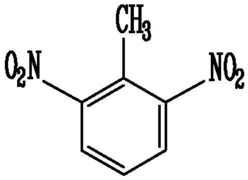
Figure 5:
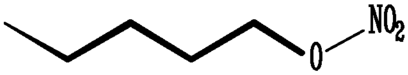
Figure 5:
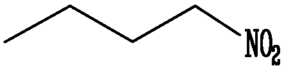
Figure 5:
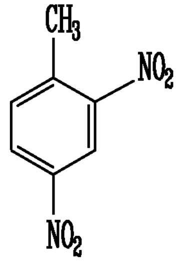
Figure 5:
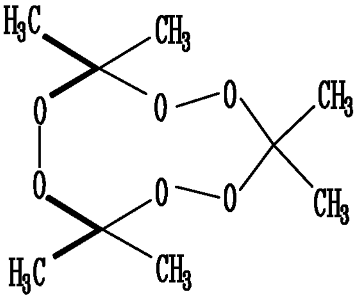
Figure 5:
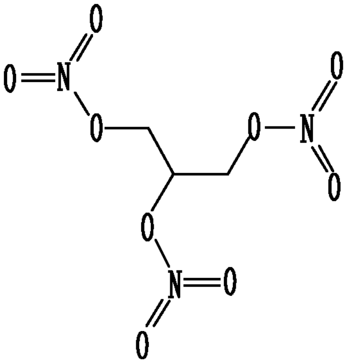
Figure 5:
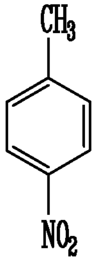

Samplers of the present invention provide improved collection of analytes for detection of these various compounds and agents. Analytes include, but are not limited to, e.g., explosives, narcotics, pharmaceutical process contaminants, biological warfare agents, chemical warfare agents; nerve agents; pesticides, environmental toxins, including analogues and stimulants of these compounds. FIG. 5 shows chemical structures of selected explosives and explosive compounds collected by enhanced samplers. Explosives and explosives compounds include, but are not limited to, e.g., ammonium nitrate fuel oil (ANFO); 2-amino-4,6-dinitrotoluene (DNT); 4-amino-2,6-dinitrotoluene; ammonium nitrate; 2,4-dimethyl-1,3-dinitrobutane; 2,4-dinitrotoluene; ethylene glycol dinitrate; GOMA-2; hexamethylenetriperoxidediamine (HMTD) hexanitrostilbene; octahydro-1,3,5,7-tetranitro-1,3,5,7-tetrazocine (HMX); mononitrotoluene; nitroglycerine (NG); pentaerythritol tetranitrate (PETN); 1,3,5-trinitroperhydro-1,3,5-triazine (RDX); SEMTEX; SEMTEX-A; SEMTEX-H; N-methyl-N,2,4,6-tetranitroaniline (TETRYL); triacetone triperoxide (TATP); 2,4,6-trinitrotoluene (TNT); 1,3,5-trinitrobenzene; C4; including combinations of these various explosives materials.

Figure 6A:
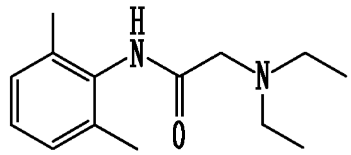
FIGS. 6*a*-6*c* show other analytes collected by samplers of the present invention.
Figure 6A:
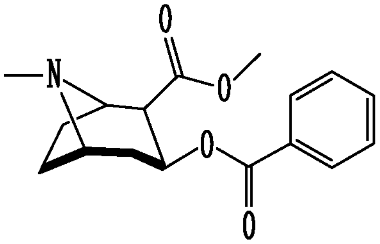
Figure 6A:
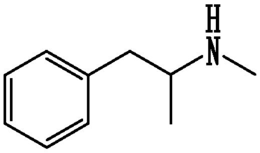
Figure 6A:
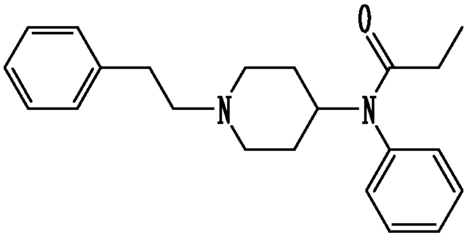
Figure 6A:
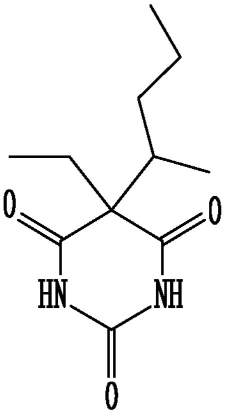
Figure 6A:
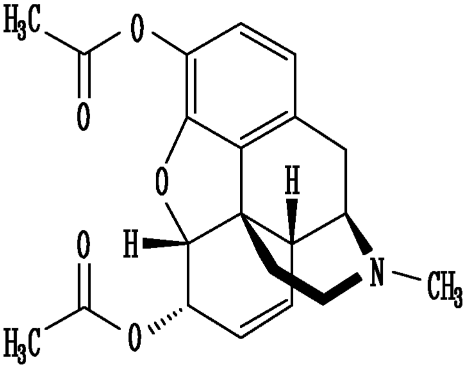
Figure 6B:
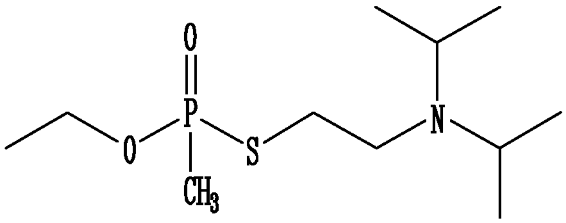
Figure 6B:
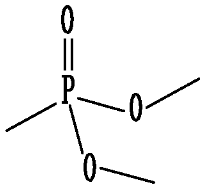
Figure 6B:
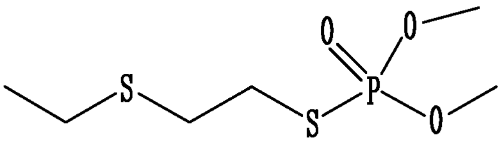
Figure 6B:
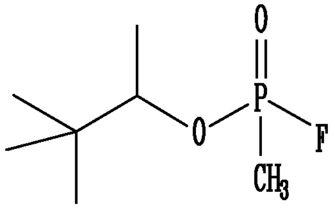
Figure 6B:
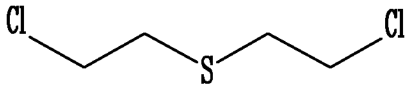
Figure 6C:
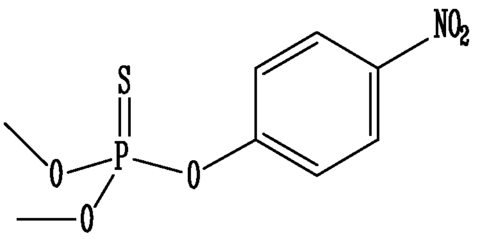
Figure 6C:
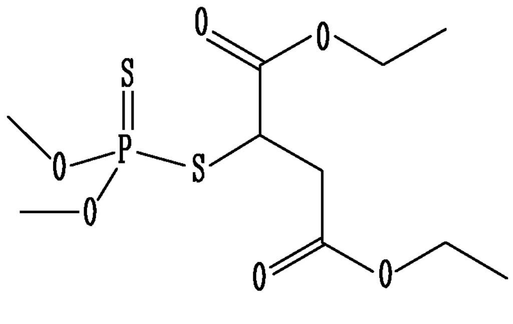

FIGS. 6*a*-6*c* show chemical structures of other analytes collected by enhanced samplers described herein including, but not limited to, e.g., drugs, illicit drugs, narcotics, chemical warfare agents, nerve agents, biological warfare agents, and pesticides. FIG. 6*a* shows exemplary drugs including, but not limited to, e.g., 6-acetylmorphine; alprazolam, amobarbital; amphetamine; antipyrine; benzocaine; benzodiazepine; benzoylecgonine; bromazepam; butalbital; carbetapentane; cathinone; chloradiazepoxide; chlorpheniramine; cocaethylene; cocaine; codeine; diazepam; ecgonine; ecgonine methyl ester; ephedrine; fentanyl; flunitrazepam; hashish; heroin; hydrocodone; hydromorphone; ketamine; lidocaine; lorazepam; lysergic acid diethylamide; lysergic acid; N-methyl-1-3 (3,4-methylenedioxyohenyl)-2-butanamine; 3,4-methylenedioxyamphetamine; DL-3,4-methylenedioxyethylamphetamine; methylenedioxymethamphetamine; marijuana; mescaline; methadone; methamphetamine and related derivatives; methaqualone; methcathinone; morphine; noscapine; opiods and their derivatives; opium; oxazepam; oxycodone; phencyclidine; pentobarbital; phenobarbital; procaine; psilocybin; secobarbital; temazepam; tetrahydrocannabinol (THC); triazolam; analogues thereof; derivatives thereof; including combinations of these various compounds.

FIG. 6*b* shows exemplary chemical warfare agents and stimulants including, but not limited to, e.g., adamsite; amiton; arsine; blood agents including, e.g., lewisite, lewisite oxide, and its analogues and simulates; CEES/HM; diphosgene; distilled mustard; chlorine; chloropicrin; cyanogen chloride; cyclohexyl methylphosphonofluoridate; dimethylmethyl phosphonate; diisopropylmethylphosphonate; ethyl N,N-dimethyl phosphoramicocyanidate; ethyldichloroarsine; hydrogen chloride; GB; GD; PFIB; phenyldichloroarsine; phosgene; phosgene oxime; isopropyl ester; isopropyl methyl phosphonofluoridate; pinacolyl methyl phosphonefluoridate; phosphonofluoridic acid; phosphonothioic acid; S-(2-(diethylamino)ethyl) O-ethyl ester; S-(2-(diethylamino) ethyl) O-ethyl ester; lewisite-1; lewisite-2; lewisite-3; methyldichloroarsine; mustard; sulfur-mustard; Demeton-S; including analogues) and its stimulants; mustard-lewisite mixtures; mustard-T mixtures; nitrogen mustard-1; nitrogen mustard-2; nitrogen mustard-3; phosgene oxime; sesqui mustard; methylphosphonothioic acid; S-(2-(bis(1-methylethyl) amino)ethyl) O-ethyl ester; VX (e.g., US and Russian VX); analogues thereof, variants thereof, including combinations of these various agents. Biological warfare agents (BWA) include, but are not limited to, e.g., anthrax; aflatoxin; botulinus toxin; ricin; saxitoxin; trichothecene mycotoxin; including combinations of these various agents.

FIG. 6*c* shows exemplary pesticides including, but not limited to, e.g., malathion, parathion, paraoxon, derivatives thereof, analogues thereof, including combinations of these compounds. Industrial chemicals include organophosphates such as detergents and foaming agents, hydrocarbons (e.g., gasoline, diesel fuel, or aviation fuel); anti-knock agents and similar compounds (e.g., methylcymantrene and methyl-t-butoxide).

In various embodiments, analyte(s) are released from the sampler in a solvent or a mixture of solvents for detection thereof. In some embodiments, analyte(s) are thermally desorbed from the sampler for detection thereof.

Desorption Temperature and Analyte Release

Figure 7:
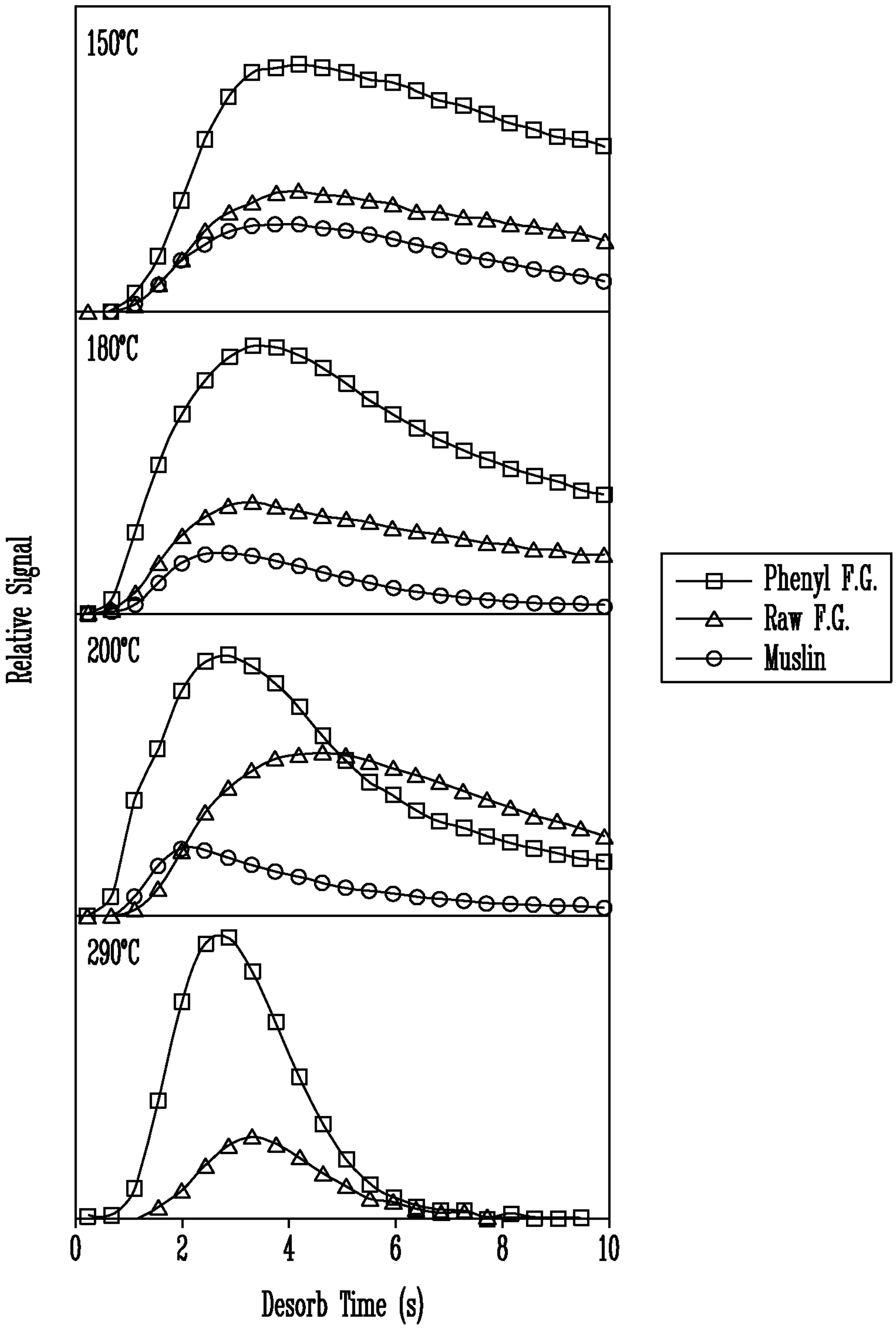
FIG. 7 compares IMS signal intensity upon release of the analyte as a function of desorption temperature and time for enhanced samplers of the present invention to commercial muslin and commercial fiberglass.

Impact of temperature on analyte desorption and release from surfaces of phenyl-functionalized glass fiber materials and their detection was investigated in a Thermal Desorption Ion Mobility Spectrometry (IMS) instrument (e.g., Smiths Detection, Inc., Morristown, N.J., USA). FIG. 7 compares IMS signal intensities for an enhanced surface sampler (i.e., phenyl-functionalized) spiked with a selected analyte (e.g., 10 ng TNT deposited from a 10 ng/μL or $4.4\times10^{-5}$ M solution) as a function of desorption temperature and desorption time compared against results for untreated commercial fiberglass (e.g., E-glass fibers, CS724 finished) and commercial muslin. Results are normalized to the muslin, IMS signal at a desorption temperature of 180° C. At a desorption temperature of 150° C., untreated fiberglass had a comparable response to that of muslin while the phenyl-functionalized fiberglass material of the present invention showed a normalized response 2 to 3 times greater than muslin. At 180° C., fiberglass materials showed a slight increase in release of TNT. Phenyl-functionalized fiberglass showed a response 4 to 5 times greater than that of muslin. At desorption temperatures of 200° C. and 290° C., absolute and relative performance of the fiberglass material decreased, which was attributed to thermal decomposition of the TNT compound at these temperatures. At 290° C., muslin had no signal due to the decomposition of the fabric material. Results show the enhanced sampler containing the phenyl-functionalized fiber material had the greatest relative TNT signal response compared to muslin at 180° C., which translates directly to the greatest absolute response. First, the area under the response curves shows that treated fiberglass releases a larger fraction of the deposited analyte. This release is significant for the pretreated (surface activated) and phenyl functionalized material. And favorable surface chemistry of the enhanced surface sampler results in a greater fraction of released analyte and larger IMS signals.

Figure 8:
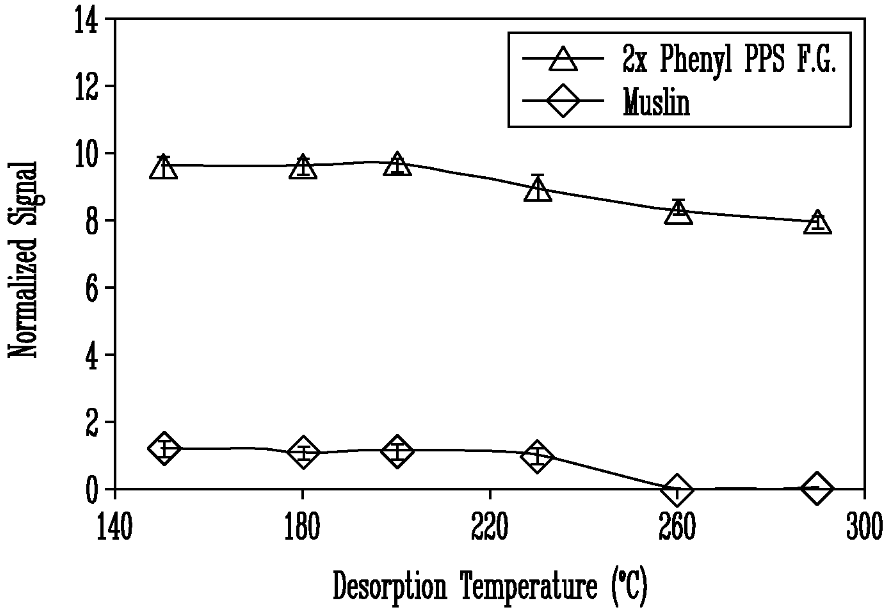
FIG. 8 compares IMS signal for enhanced samplers of the present invention upon release of analytes as a function of desorption temperature to commercial muslin.

FIG. 8 compares normalized IMS signal as a function of desorption temperature of a selected analyte (e.g., TNT) released from an enhanced sampler containing phenyl-functionalized S-glass fibers twice treated with phenyl silanes (e.g., 2× Phenyl F.G.) against commercial muslin. Phenyl-functionalized samplers and conventional muslin samplers were each spiked with 10 ng of TNT and desorbed. IMS desorption temperature was varied from 150° C. to 290° C. to optimize TNT release from both the muslin and phenyl-functionalized sampler materials. IMS signals were normalized to muslin (180° C.). Results are plotted (muslin signal=1).

Results show the phenyl-functionalized sampler (e.g., 2× Phenyl PPS F.G.) gave an IMS signal for TNT about 10-times greater than muslin. Signal decreases at temperatures above 200° C. when TNT begins to thermally decompose. Muslin did not provide a TNT signal above a desorption temperature of 260° C. However, enhanced samplers gave a signal (referenced to the muslin signal at 180° C.) that remained ~8 times greater than that observed for muslin even at a temperature of 29.0° C.

The higher thermal conductivity and lower specific heats for glass and pure silica fibers compared to muslin result in a more rapid heating of enhanced samplers containing these selected fibers. And, as shown here, this rapid heating releases TNT from the sampler into the IMS at a faster rate than for muslin. Additionally, terminal phenyl groups directly attached to the fibers assist with the retention of TNT on the surface and facilitate rapid release of TNT. In addition, only small amounts of TNT are decomposed even at high desorption temperatures. In contrast, muslin samplers demonstrate lower utility for collection and desorption of TNT due to the higher specific heat and an unsuitable surface chemistry that interacts with TNT and results in slow release of the TNT. TNT also readily decomposes prior to release into the IMS instrument from the muslin sampling material.

Effect of Thickness on Analyte Release

Sampling materials of different thicknesses with the same surface chemistry were assembled and assayed to quantitatively evaluate impact of thickness on analyte release. TABLE 2 lists numerical results showing impact of swipe thickness on IMS signal response.

TABLE 2

Impact of Swipe Thickness on IMS Response to an exemplary analyte, TNT. Data are normalized to muslin at a desorption temperature of 180° C.

| Material[2] | Thickness (mm) | Density ($g/cm^2$) | IMS Signal[3] |
|---|---|---|---|
| Muslin (thick) | 0.32 ± 0.01 | 0.013 | 1.0 ± 0.1 |
| Muslin (thin) | 0.26 ± 0.01 | 0.012 | 2.1 ± 0.3 |
| PPE F.G. (thick) | 0.27 ± 0.03 | 0.028 | 6.0 ± 0.4 |
| PPE F.G. (med) | 0.20 ± 0.01 | 0.020 | 6.8 ± 0.3 |
| PPE F.G. (thin) | 0.10 ± 0.01 | 0.011 | 8.2 ± 0.2 |
| PSiSF F.G. (thick) | 0.29 ± 0.02 | 0.028 | 5.6 ± 0.4 |
| PSiSF F.G. (thin) | 0.14 ± 0.01 | 0.012 | 6.2 ± 0.4 |

[1]IMS (e.g., Thermal Desorption IMS, Smiths Detection, Inc., Morristown, NJ, USA)
[2]PPE = Polymer Primer on E-glass, finish 497A; PSiSF—Pure Silica, Silane Functionalized; F.G. = Fiberglass cloth.
[3]Materials preconditioned at 180° C. overnight under vacuum. Response to 10 ng liquid TNT spike taken at 1 minute assay interval. Muslin not preconditioned.

Preconditioning may be a preliminary step prior to exposure of the samplers to the analyte that effectively cleans the sampler of unwanted contaminates. In some embodiments, preconditioning may involve heating the swipe material to 180° C. in a vacuum oven for a time of about 18 hours. Preconditioning also removes any remaining residues from the fabrication process so as not to interfere with swipe performance. Here, muslin cloth was not preconditioned because the manufacturer claimed the material to be field ready as-received. It was found to degrade at this temperature and time.

Results show that the thicker the sampling material, the lower the measured TNT signal. Relative IMS signal from a fixed mass of spiked TNT was strongly nonlinear as a function of swipe thickness. For example, a 0.06 mm increase in muslin thickness was observed to reduce IMS signal by over 50%. In general, IMS response data show that the measured signal material is in part impacted by thickness of the fabric material.

Other factors that influence results include, analyte collection efficiency, release of analytes from the sampling material, transfer of the desorbed analyte to the downstream instrument, and the durability of the sampling material. Results show IMS analytical accuracy and repeatability are due in part to the uniformity of the thickness of the sampling material. In addition, permeability of the swipe materials—a function of weave and morphology and thickness—may also impact recovery of desorbed analytes. In some embodiments, the thinner the swipe, the greater quantity of analyte recovered from the sampling materials upon thermal desorption. However, no limitations in thickness or weave are intended.

Figure 9:
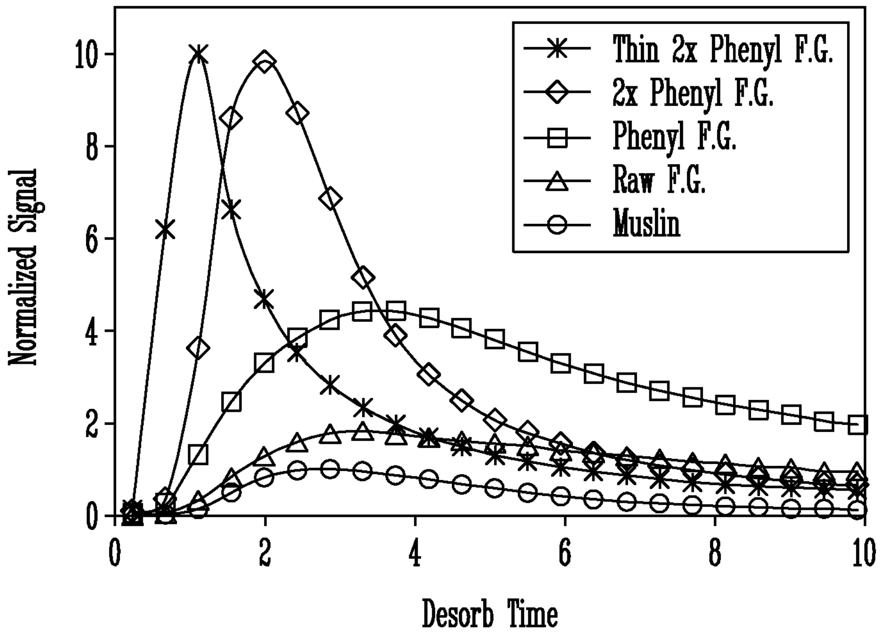
FIG. 9 compares impact of surface modification for enhanced samplers of the present invention and material thickness on normalized IMS signal of an exemplary analyte compared to commercial muslin and commercial fiberglass.

FIG. 9 compares impact of surface modification and material thickness on the IMS signal obtained upon release of an exemplary analyte (e.g., TNT) for enhanced samplers compared with untreated/unmodified fiberglass and commercial muslin. In the figure, analyte release from the functionalized surfaces is faster, signal peaks are significantly sharper, and signal intensity is greater than for the unmodified fiberglass and commercial muslin materials. Peak shape and sharpening is due in part to the glass fibers having intrinsically better thermal properties than muslin (described previously herein), which results in faster thermal desorption of analytes. Functionalizing (treating) the surface more than once, e.g., twice, with, e.g., a phenyl silane or a phenyl terminal group (denoted here as "2× Phenyl"), may further enhance the affinity effects observed for singly-functionalized surfaces. In addition, additional functionalization can be performed to provide a more chemically uniform lipophilic surface layer that enables faster release of analytes or a release of a larger fraction of analytes from the sampler surface. Further, as shown in the figure, a thinner fabric thickness (see, e.g., "thin" data, 2× Phenyl) may improve thermal desorption, may decrease desorption time at which, a maximum signal is achieved, and may reduce thermal mass. Enhanced desorption is attributed to improved swipe permeability of the thinner material that promotes analyte transport out of the sampler material at higher gas flow rates, and/or a reduction in analyte re-adsorption on the swipe surface.

Sensitivity of Enhanced Surface Samplers

Enhanced surface samplers described herein may be used to collect, retain, and detect target analytes retrieved from various surfaces including, countertop surfaces, luggage surfaces, cargo surfaces, vehicle surfaces, building interior and exterior surfaces, clothing, skin surfaces, and other surfaces. Performance of chemically modified fiberglass cloth was compared with standard muslin.

Figure 10:
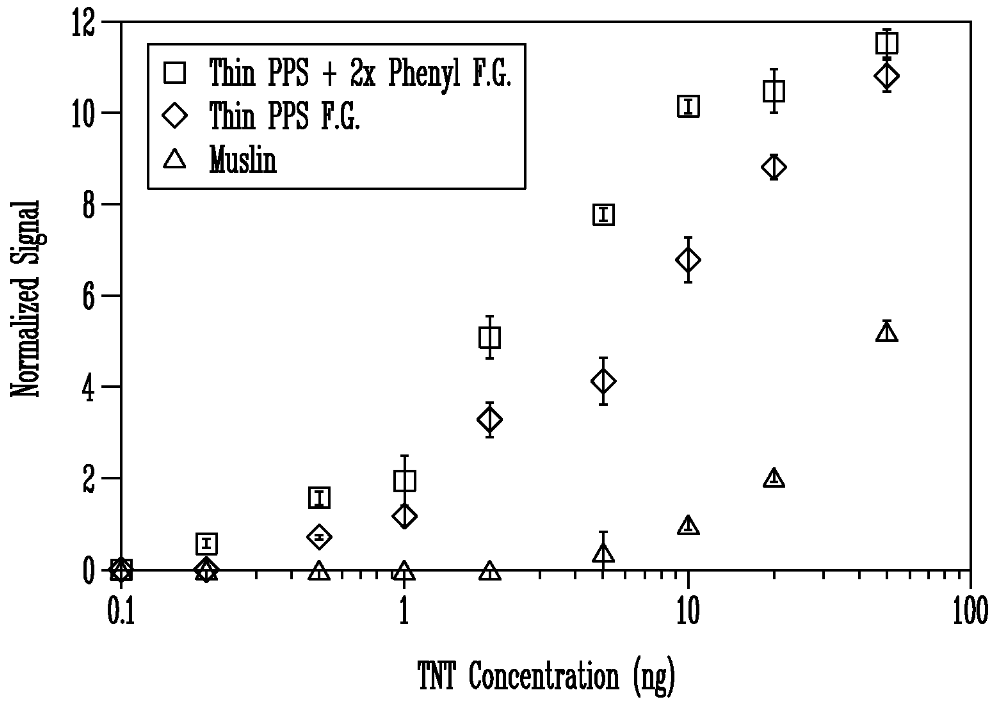
FIG. 10 compares relative sensitivity limits for enhanced samplers of the present invention compared to commercial muslin and commercial fiberglass.

FIG. 10 compares analyte sensitivity of thin (~0.1 mm) phenyl-modified glass fiber samplers (e.g., thin PPS+2× Phenyl F.G.) to commercial muslin and commercial fiberglass. Samplers were spiked with increasing concentrations of from 0.1 ng to 50 ng TNT and analyzed by IMS assay. A one-minute assay interval was used. All results were normalized to the IMS response for muslin at 180° C. spiked with 10 ng TNT. Data are plotted. In the figure, the thin phenyl-modified glass fiber samplers detected TNT at a 0.2 ng level, which is at least a factor of 10 below that observed for muslin. At a TNT level of 10 ng, the 2× phenyl-modified glass fiber samplers produced a signal 10-fold greater than that from muslin. Data showed two linear regimes for both the functionalized fiberglass and the untreated fiberglass materials. A first linear region was observed between 0.1 ng and 1 ng. A second linear region was observed between 1 ng and 50 ng. In the first linear region (i.e., low concentration region of the IMS), surface-functionalized samplers spiked with TNT exhibited a sensitivity enhancement of at least 50 times (50×) compared with standard muslin cloth materials and cotton swabs, and were consistently superior to unmodified fiberglass. In the second linear region, the difference was less pronounced suggesting an approach to saturation of the IMS detector (i.e., a departure from detector response) above a spike amount of about 10 ng. Results for the first linear region would suggest that modified glass fiber materials are also superior to untreated fiberglass and muslin and limited only by the detector response. In general, surface-functionalized sampling materials of the present invention show better analyte recovery, better analyte release, and better repeatability for sequential use and reuse compared to untreated fiberglass and muslin. At larger concentrations of the analyte, unmodified fiberglass and muslin can show a more convergent response or an equivalent response in the ion mobility spectrometer when the analyte concentration overwhelms the detector.

Surface functionalization of pure silica fiber materials (PSiSF) with, e.g., phenyl silanes (i.e., PSiSF+Phenyl) impacts its performance as a sampling material. TNT spikes on the PSiSF+phenyl-functionalized surface at both a 5 ng and 10 ng level showed a large increase in relative IMS signal response compared with unmodified PSiSF. And, a single functionalization of the pure silica fiber surface with phenyl silane provided a significantly higher relative TNT signal than those from functionalized E-glass or functionalization S-glass. Results are attributed to a greater density of surface silanol sites of pure silica compared to E-glass or S-glass fibers, which can increase the density of organosilanes installed. However, unlike E-glass or S-glass fiber materials, a second functionalization step (i.e., PSiSF+2× Phenyl) and a reduction in thickness did not significantly enhance the performance. Results are attributed to a near-quantitative release of analyte at the 5 ng level and a saturation of the detector at the 10 ng level.

Collection Efficiency

Analyte collection from surfaces is due in part to fiber size and weave of the selected sampler material. In one test, analyte collection with an enhanced sampler made of phenyl-functionalized glass fibers exceeded muslin by a factor of roughly 2-fold, although factors such as pressure on the swipe surface were not investigated. Because glass, pure silica, and/or metal fiber fabrics are engineered materials, fiber size, weave, and thickness can be adjusted to improve analyte collection, analyte release, and sampling material durability. Optimization of these features can be expected to improve analyte collection, release, and durability.

Explosives

TABLE 3 compares relative IMS response for selected explosives and explosive compounds released from enhanced surface samplers compared to muslin cloth.

TABLE 3

Relative IMS response of enhanced surface samplers for selected explosives and explosive compounds normalized to muslin cloth.

| Compound | Concentration (ng/μl) | Normalized Signal |
|---|---|---|
| TNT[1] | 10 | 9.3 ± 0.1 |
| HMX[1] | 100 | 7.6 ± 0.3 |
| Picric Acid[1] | 100 | 5.6 ± 0.1 |
| NG[1] | 10 | 3.4 ± 0.2 |
| EGDN[1] | 100 | 1.9 ± 0.1 |
| RDX[1] | 10 | 1.5 ± 0.1 |
| TATP[1] | 10 | 1.4 ± 0.3 |
| PETN[1] | 10 | 1.3 ± 0.1 |
| Tetryl[1] | 30 | 1.2 ± 0.1 |

[1]IMS (e.g., Thermal Desorption IMS, Smiths Detection, Inc., Morristown, NJ, USA) operated in negative ion mode at a desorption temperature of 180° C.

Analytes listed in TABLE 3 had IMS signals that were superior to those obtained with muslin. Listed analytes represent a wide variety of structural characteristics common to explosives including, e.g., nitroaromatics, nitroalkanes, and peroxides found in, e.g., military, industrial, or homemade explosives. Results obtained for the various explosives indicate that the applied surface chemistry is uniform, since different explosives compounds may be expected to exhibit different affinities for the sampling surface of the enhanced swipe. Surface uniformity ensures that the fabric material behaves predictably and allows the advantages of the surface samplers to be extended to other explosive materials, as well as other general categories of chemicals. In addition, samplers enable detection of many analytes that have a sufficiently strong response signal (e.g., in an IMS) but do not produce a corresponding signal on muslin. Examples include analytes such as DNT and heroin, described hereafter. For example, thin samplers functionalized once (e.g., thin PPS+1× Phenyl) gave an absolute IMS response for DNT of 8.0±0.3. Thin samplers functionalized twice (e.g., thin PPS+2× Phenyl) gave an absolute IMS response for DNT of 9.3±0.1.

Drugs

TABLE 4 compares IMS results for selected drugs released from enhanced samplers of the present invention compared with muslin.

TABLE 4

Relative IMS response for selected drugs obtained on enhanced surface samplers compared to muslin cloth. Results are normalized to muslin.

| Compound | Concentration (ng/μl) | Normalized Signal |
|---|---|---|
| Methamphetamine[1] | 30 | 1.9 ± 0.4 |
| Cocaine[1] | 30 | 0.5 ± 0.1 |

[1]IMS (e.g., Thermal Desorption IMS, Smiths Detection, Inc., Morristown, NJ, USA) operated in positive ion mode at a desorption temperature of 200° C.

Thermal desorption is not typically applied to surface sampling for drugs, whether illicit or commercial. Surface samples are typically taken to a laboratory, where extraction of analytes is performed with solvent extraction. Then, samples are analyzed, e.g., with an LC or GC. IMS results in TABLE 4 for these analytes provide direct evidence of the versatility of the modified glass fiber materials for many and varied organic compounds. As shown here, modified glass fiber swipes or swabs can allow surface sampling techniques to be used to screen for drugs and other analytes in the field. Applications include rapid screening of, e.g., crime scenes to reduce the number of samples returned to a laboratory for analysis, and consequently to reduce costs associated with obtaining, and processing crime scene evidence. In addition, the enhanced surface samplers enable detection of many analytes that have a sufficiently strong response signal (e.g., in an IMS) but do not produce a corresponding signal when released from muslin. For example, 30 ng of heroin produces a signal that is unambiguous and provides a signal-to-noise ratio of at least 3.

Chemical Warfare Agents

TABLE 5 compares IMS results for selected CWA stimulants released from enhanced samplers of the present invention compared with muslin.

TABLE 5

Relative IMS response for selected chemical warfare agent (CWA) simulants normalized to muslin cloth.

| Compound | Concentration (ng/μl) | Normalized Signal |
|---|---|---|
| DMMP[1] | 10 | 1.2 ± 0.1 |
| Demeton-S[1] | 10 | 1.0 ± 0.1 |

[1]IMS (e.g., Thermal Desorption IMS, Smiths Detection, Inc., Morristown, NJ, USA) operated in positive ion mode at a desorption temperature of 220° C.

IMS results in TABLE 5 provide direct evidence of the versatility of surface samplers made of modified glass fiber materials for many and varied organic compounds. Surface sampling with field analyses using thermal desorption is not typically applied in the art for detecting chemical warfare agents. However, as shown here, two nerve agent surrogates both exhibited IMS responses at least equal to, or greater than, those observed with muslin. Thus, modified glass fiber swipes or swabs can allow surface sampling techniques to be used to screen for chemical warfare agents and nerve agents in the field and allow rapid screening for suspect violations of various treaties, to reduce the number of samples returned to a laboratory for analysis, and to reduce the cost of obtaining and processing evidence on site.

Solvent Extraction

In some embodiments, analytes may be recovered from the surface of the samplers by extraction in selected solvents. Any solvent that provides solubility for the selected analyte may be used. No limitations are intended. TABLE 6 compares recovery results for a nerve agent (i.e., CWA) stimulant dimethyl-methylphosphonate (DMMP) obtained with a phenyl-silane functionalized swipe sampler, compared against untreated fiberglass and commercial muslin. Data in column 2 (acetone) report relative signal intensity values for analytes (here DMMP) recovered from samplers by solvent extraction with acetone, and analyzed through a GC-MS. IMS signal data are also reported for comparison, although IMS testing is not a liquid extraction method. Results are normalized to muslin.

TABLE 6

Compares relative recovery of DMMP for phenyl-functionalized samplers of the present invention compared to untreated fiberglass materials and conventional muslin.

| Swipe Material | Solvent Extraction[1] | IMS Signal[2] |
|---|---|---|
| Muslin | 1.00 | 1.0 ± 0.1 |
| Blank (E-glass) | 1.63 | 0.0 |
| Blank (S-glass) | 0.24 | 0.5 ± 0.1 |
| Blank (pure silica) | 0.45 | 1.4 ± 0.2 |
| 1x + Phenyl (E-glass) | 1.02 | 0.0 |
| 1x + Phenyl (S-glass) | 0.19 | 0.6 ± 0.2 |
| 1x + Phenyl (pure silica) | 0.84 | 2.1 ± 0.1 |
| 2x + Phenyl (E-glass) | 1.75 | 0.0 |
| 2x + Phenyl (S-glass) | 2.24 | 0.8 ± 0.1 |
| 2x + Phenyl (pure silica) | 2.53 | 2.0 ± 0.1 |

[1]Solvent = Acetone.
[2]IMS (e.g., Thermal Desorption IMS, Smiths Detection, Inc., Morristown, NJ, USA).

Data in TABLE 6 show that solvent washing is a viable method for extracting analytes captured from enhanced E-glass, S-glass, and pure silica fiber samplers functionalized with, e.g., phenyl silanes (e.g., 2×+Phenyl). Data further indicate that enhanced samplers can be used in applications that currently employ conventional muslin samplers. Results are important because many sampling procedures call for solvent extraction of analytes from a surface sampler. Results further show that enhanced samplers provide a superior signal intensity and performance compared with conventional muslin. Data indicate that modified glass fiber materials release a greater fraction of collected analytes from the sampler surface into the analyzing instrument (e.g., LC, GC, IMS, etc.) producing a greater instrument response, which increases the probability of detecting the analyte of interest:

Conditioning (Preconditioning) and Surface Cleaning

Enhanced samplers are not limited to single-use applications. Enhanced samplers may be conditioned for re-use.

In some embodiments, surface samplers may be thermally conditioned to desorb analytes to ready the samplers for re-use.

In some embodiments, surface samplers may be preconditioned or conditioned by cleaning the surface of the sampler to remove residual analyte residues (conditioned) or to remove residues involved in surface functionalization. In some embodiments, conditioning may include washing or rinsing the surface of the sampler one or more times with a solvent or a mixture of solvents to clean the surface. Cleaning may include use of solvents that have affinity for analytes residues in the samplers and/or solvent/surfactant (detergent) combinations that remove residues from the samplers. Solvents may be chosen based on analyte solubility, or those that do not interfere with activity of the sampling surface. Solvents include, but are not limited to, e.g., toluene, methanol, methylene chloride, propanol, acetone, and including combinations of these various solvents. Various high volatility solvents may also be employed. For some applications, suitable vapor pressures may be between about 0.05 atm and about 0.032 atm at 25° C.

As detailed herein, conditioning or preconditioning may include drying the sampler after cleaning. In some embodiments, drying includes vacuum drying the sampler fabric. Drying temperatures may be selected above 100° C. In some embodiments, drying temperature may be greater than about 150° C. In some embodiments, drying temperature may be greater than about 250° C. In some embodiments, drying temperature may be between about 150° C. and 300° C. Drying times are selected such that no residual solvents or detergents used to remove analyte residues are detectable in the detector. In some embodiments, drying time may be selected above about 6 hours. In some embodiments, drying time may be between about 6 hours to about 24 hours. In some embodiments, drying time may be greater than 18 hours. In some embodiments, drying time may be below 24 hours. In some embodiments, drying time may be below 6 hours. In some embodiments, pre-conditioning is a step involved in the post-treatment of the surface samplers. Thus, pre-conditioning does not need to be accomplished "just prior" to use.

Sampler Longevity

Longevity (i.e., lifetime) of the sampler is a function of the surface activity, integrity, and/or signal noise observed in the detection platform. Discoloration May also be used to assess the quality of the sampler. Standards may also be used to measure the viability of the sampler surface.

Applications

Enhanced surface-functionalized samplers including glass, silica, and/or metal fibers provide enhanced collection and subsequent assay of target analytes and trace organic residues from surfaces that find applications in, e.g., international treaty verification; military; forensic; security; transportation security (e.g., explosives detection); law enforcement (e.g., drug detection and forensic sampling); environmental sampling; industrial sampling (e.g., health and safety monitoring), and biomedical applications. These samplers provide benefits compared to muslin and cotton sampling materials that include, but are not limited to: 1) up to 50-times better analyte sensitivity, 2) improved surface homogeneity and analyte affinity that enables better analyte collection: 3) better analyte release that enhances analyte recovery from the sampler surface, 4) a flexible and tailored surface chemistry that enables selectivity and tuning to specific analytes of interest or for specific applications, 5) samplers can be thermally and/or chemically cleaned and reused without a change in performance, and 6) better repeatability for sequential and repeated usage.

The following Examples provide a further understanding of the invention.

Example 1

Pretreatment/Activation of Fiber Surfaces

In some embodiments, fabrics containing glass and fused silica fibers were pretreated with a base and/or an acid to expose a maximum number of silanol groups on the surface of the fibers. In cases where fabric was pretreated, fabrics were refluxed in acetone, e.g., for 3 hours and dipped, e.g., in 1.0 M NaOH for 1 hour. Excess base may be neutralized with 0.1 M HCl, e.g., for 30 minutes. Fabrics may then be washed with water. Concentrations of base and acid can be varied as needed. For example, in some thick (>0.25 mm) fabrics, fibers may be treated with 1.0 M NaOH, e.g., for 4 hours, rinsed with water, and followed by neutralizing excess NaOH with 0.1 M HCl, e.g., for 30 minutes. Thin (<0.14 mm) fabrics may be treated similarly, but may involve a reduced rinsing time in NaOH solution, e.g., from 4 hours to 1 hour. For thin glass-A fiber materials (e.g., ASTROQUARTZ®), a rinsing time of 1 hour in 2 M NaOH, and 30 minutes in 0.2 M HCl was sufficient. Longer exposures in basic solution (e.g., 4 hours) may be used, or higher concentrations of base (e.g., 2 M NaOH) and acid (e.g., 0.2 M HCl) may be used. When rinsed, fabrics treated with base or acid may be dried, e.g., at 120° C. and, e.g., for 3 hours. Pretreatment or preconditioning may be a function of fiber diameter, fiber weave, fiber density, permeability, and like parameters. In some embodiments, pretreatment is not necessary, e.g., when pretreatment may dissolve or weaken fibers of the fabric, or, e.g., when thinner fabrics are used.

Example 2

Silanization

In one exemplary process, fabrics containing pretreated glass and/or silica fibers were refluxed overnight (e.g., 18 hours) in a 10% phenyl trimethoxysilane solution in toluene solvent. The fabrics were then rinsed (e.g., twice) with 100 mL toluene, and then rinsed (e.g., twice) with 100 mL of methanol. Secondary treatments using the same process were carried out to enhance the density of silanes on the surface of the fibers.

Example 3

Stabilization of Surface Chemistry

Fabrics containing functionalized (e.g., silanized) glass and/or silica fibers were stabilized by drying at 180° C. under vacuum for 18 hours to remove excess solvent and finalize surface condensation reactions.

Example 4

Sampler Thickness and Density

Swipe sampler thickness measurements were obtained with a digital caliper (e.g., a Absolute Digimatic Caliper Series 500, Mitutoyo, Aurora, Ill., USA). Ten measurements from each of five different pieces (locations) of each respective swipe were collected (minimum 50 points). Error was assessed by calculating standard deviation for all measurement points. Density measurements were also obtained by taking the mass of swipes and dividing by the dimensions of the fabric pieces. Values were reported as averages of five density measurements.

Example 5

IMS Desorption and Analysis of Analytes

An IMS was configured with a sliding stage mount coupled to an ionizing source (e.g., a $^{63}$Ni β ionization source) that was further coupled to a drift tube equipped with an electric field generator. A thermal desorber was used to volatilize analytes (e.g., explosive compounds) from various locations on the samplers. A carrier gas directed the analyte(s) to a glass inlet liner that ended at an ionizing source (e.g., a $^{63}$Ni β ionization source), where analyte(s) were ionized. Hexachloroethane dopant gas controlled ion chemistry (e.g., preventing charge losses or charge transfer losses from the analytes) within the drift tube. Purified air, used as the drift gas, effected mobility of the ionized particles. Ionized particles were carried by electric field to a collector. Collection time, relative to the calibrant (4-nitrobenzyl nitrile), was used to identify explosive compounds. The IMS instrument was operated (e.g., in negative ion mode for detection of explosives) at a desorption temperature of 180° C. and a collection time of 10 seconds. Drift tube and inlet temperatures were set at 114° C. and 240° C., respectively. Dopant gas was set at 239 mL/min and the drift (carrier) gas was set at 351 mL/min or per standard instrument settings. Sample analysis consisted of first mounting an un-spiked sampler on the IMS thermal desorption stage to obtain a background spectrum. Sampler was then spiked using a 2 μL GC syringe with 1 μL of methanol solution containing, e.g., 10 ng/μL TNT. The solvent was evaporated (~15-20 seconds), leaving the explosive residue. For consistency, spiked samplers were mounted on the thermal desorption stage one minute after completion of the baseline run, and assayed for one minute. Data for all samplers were collected similarly to avoid IMS instrument variations with time and conditions. Ion mobility spectra were analyzed to determine the maximum TNT signal and noise. The TNT peak selected had a reduced mobility ($K_o$) of 1.45 $cm^2\ V^{-1}s^{-1}$ in agreement with literature values. Background signal was subtracted from the TNT sample signal (at the TNT $K_o$). Noise was calculated by taking the root mean square (RMS) along the 16 ms drift region. Sampler data were all normalized to the muslin response.

Example 6

Collection of Surface Residues

Determination of dry analyte pickup from surfaces was measured by depositing 30 ng of a TNT standard dispersed in a methanol ($4.4\times10^{-5}$ M TNT) solution was placed onto the surface of a 2-inch (5.08 cm) diameter TEFLON® disk using a 10 microliter (μL) syringe. Methanol was evaporated leaving the 30 ng TNT deposition as a residue at the center on the surface of the TEFLON® disk. A 30 ng spike of analyte was selected to provide statistically sound instrumental signals after potential collection loses had been taken into account. Following deposition, the swipe material was used to sample TEFLON® surfaces. Swipe sampler material was then immediately transferred to the IMS for standard analysis. Each swipe sample was run in triplicate using fresh swipe material for each assay.

Example 7

Repeatability

Repeatability tests were performed using muslin and a thin twice-treated (2×) phenyl-functionalized S-glass fiber material. Replicate cycles were run on the same swatch to quantify repeatability and reusability of the material. A single cycle consisted of running a background and then spiking the swipe with 10 ng TNT. Run was repeated ten times for each material. Thermal conditioning of muslin consisted of passing the material twice through the IMS and then cycling as described above. Functionalized glass fiber samplers showed superior analyte release and an IMS repeatability with less than 5% change over ten replicate cycles. Results showed a consistent noise output lower than that of muslin.

Example 8

Sensitivity

IMS instrument response and sensitivity of enhanced samplers of the present invention to quantitative liquid TNT spikes were tested against commercial muslin and commercial fiberglass materials. In one test, enhanced samplers containing phenyl functionalized thin S-glass fibers were compared with commercial muslin and commercial fiberglass (e.g., thin S-glass fibers with polymer primer finish, 497A). Analysis consisted of spiking samples with 1 μL of a known TNT concentration ranging from 0.1 ng to 50 ng TNT in methanol and conducting IMS assays of the samples. A one minute assay interval was used. All results were normalized to muslin.

While exemplary embodiments of the present invention have been shown and described, it will be apparent to those skilled in the art that many changes and modifications may be made without departing from the invention in its true scope and broader aspects. The appended claims are therefore intended to cover all such changes and modifications as fall within the spirit and scope of the invention.

What is claimed is:

1. A sampling device, comprising:

a fabric of a selected thickness comprising selected glass and/or metal oxide and/or oxide-coated glass or metal fibers therein with selected silane ligands directly attached to the surface thereof defining a functionalized surface on said fabric, said fabric with said functionalized surface collects and retains an analyte(s) thereon upon contact with same.

2. The sampling swipe of claim 1, wherein the glass fibers include pure silica, an E-glass, an S-glass, a non-metal oxide, or a combination thereof.

3. The sampling swipe of claim 1, wherein the fibers are metal fibers that include or are composed of a metal oxide, an oxide-coated metal, a metal coated with a metal oxide of the same or different kind, or a combination thereof.

4. The sampling swipe of claim 1, wherein the fibers are glass fibers that include a metal oxide, an oxide coated metal, a metal coated with a metal oxide of the same or different kind, a non-metal oxide, or a combination thereof.

5. The sampling swipe of claim 1, wherein the silane ligands are selected from silanes, alkoxysilanes, silanols, or a combination thereof.

6. The sampling swipe of claim 1, wherein the silane ligands include a terminal group attached thereto that provides an affinity for said analyte(s) greater than the affinity provided absent the terminal group.

7. The sampling swipe of claim 1, wherein the thickness of the fabric is selected between about 0.01 mm and about 0.2 mm; or about 0.05 to about 0.15; or about 0.01 mm to about 0.10 mm.

8. A method of making, comprising the steps of:

silanizing a fabric of a selected thickness comprising selected glass and/or metal oxide and/or oxide-coated metal fibers therein by directly attaching silane ligands of at least one type to surfaces of said fibers forming a functionalized sampling surface on said fabric with an affinity to collect an analyte(s) thereon upon contact with same and an ability to release same at a selected release condition therefrom that is greater than a cellulosic material.

9. The method of claim 8, further including chemically attaching a terminal group to the at least one silane ligand silane ligands attached to said surface of said fibers to provide an affinity for collection of said analyte(s) greater than the affinity provided absent the terminal group.

10. The method of claim 8, wherein the silanizing includes silane ligands selected from silanes, alkoxysilanes, silanols, or combinations thereof.

11. The method of claim 8, wherein the silanizing includes covalently attaching silane ligands having a selected terminal group chemically attached thereto.

12. The method of claim 8, wherein the silanizing is performed one or more times with the same or different silane ligands.

13. The method of claim 8, wherein the silanizing includes refluxing the fabric in a solution containing at least one organic solvent and at least one silane ligand.

14. The method of claim 13, wherein the refluxing includes a time up to about 18 hours or greater and a temperature of at least about 180° C.

15. The method of claim 8, wherein the thickness of the fabric is selected between about 0.01 mm and about 0.2 mm; or about 0.05 to about 0.15; or about 0.01 mm to about 0.10 mm.

16. The method of claim 8, further including stabilizing the fabric to prepare the fabric for collection of the analyte(s).

17. The method of claim 16, wherein the stabilizing includes heating the fabric at a temperature of at least about 180° C. under vacuum for a time up to about 18 hours or greater.

18. The method of claim 8, further including pretreating fibers of the fabric prior to silanizing to increase the density of silanols on the surface of the fibers that are reactive with the silane ligands.

19. The method of claim 18, wherein the pretreating includes a method selected from the group consisting of: calcining, refluxing in a solvent(s), contacting with alkaline solution, contacting with acid solution, heating, and combinations thereof.

20. The method of claim 19, wherein the contacting includes a concentration of base or acid up to about 10M and a time up to about 4 hours.

21. The method of claim 8, further including post-treating the fabric after silanizing with a selected solvent(s) to remove unbound silane ligands or impurities therefrom.

22. A method of use, comprising the steps:

collecting an analyte(s) on a sampler comprising a fabric composed of selected glass, and/or metal oxide and/or oxide-coated metal fibers therein with silane ligand(s) comprising terminal group(s) directly attached to the surfaces of said fibers defining a sampling surface on said sampler; and releasing the analyte(s) from the sampling surface of the sampler for detection of the analyte(s).

23. The method of claim 22, wherein the collecting includes contacting a surface containing an analyte to collect the analyte(s) on the sampling surface of the sampler.

24. The method of claim 23, wherein the contacting includes a collection temperature up to about 100° C.

25. The method of claim 22, wherein the releasing includes thermally desorbing the analyte(s) at a temperature between about 100° C. and about 500° C.

26. The method of claim 22, wherein the releasing includes releasing a concentration of the analyte(s) equal to or greater than the concentration released from a muslin-containing material of equal thickness.

27. The method of claim 22, wherein the releasing includes detecting the analyte(s) in a detection instrument, with a signal intensity of the analyte(s) at least equal to or greater than the signal intensity of the analyte(s) obtained from a muslin or cotton-containing material at an equivalent analyte (s) mass.

28. The method of claim 22, wherein the releasing includes releasing the analyte(s) from the sampling surface of the sampler in a solvent or a mixture of solvents and detecting the analyte(s) in a detection instrument.

29. The method of claim 22, wherein the releasing includes cleaning the sampling surface of the sampler to prepare the sampler for re-use or collection of another analyte(s) from a selected surface.

* * * * *